US012802417B2

(12) United States Patent
Kikuta

(10) Patent No.: US 12,802,417 B2
(45) Date of Patent: Nov. 17, 2026

(54) IMAGE PROCESSING APPARATUS, IMAGE PROCESSING METHOD, AND STORAGE MEDIUM, WITH DETERMINING BETWEEN UPDATING LEARNED MODEL AND UPDATING ADJUSTMENT PARAMETERS FOR ADJUSTING PIXEL VALUE WITHOUT UPDATING LEARNED MODEL

(71) Applicant: CANON KABUSHIKI KAISHA, Tokyo (JP)

(72) Inventor: Kyohei Kikuta, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 320 days.

(21) Appl. No.: 18/419,931

(22) Filed: Jan. 23, 2024

(65) Prior Publication Data

US 2024/0282088 A1 Aug. 22, 2024

(30) Foreign Application Priority Data

Feb. 16, 2023 (JP) ................................ 2023-022438

(51) Int. Cl.

*G06V 10/778* (2022.01)
*G06T 7/00* (2017.01)
*G06V 10/82* (2022.01)

(52) U.S. Cl.

CPC ............ *G06V 10/778* (2022.01); *G06T 7/001* (2013.01); *G06V 10/82* (2022.01); *G06T 2207/10008* (2013.01); *G06T 2207/20081* (2013.01); *G06T 2207/20084* (2013.01); *G06T 2207/30144* (2013.01)

(58) Field of Classification Search

CPC ...... G06V 10/778; G06V 10/82; G06T 7/001; G06T 2207/10008; G06T 2207/20081; G06T 2207/20084; G06T 2207/30144

See application file for complete search history.

(56) References Cited

U.S. PATENT DOCUMENTS

2020/0393998 A1* 12/2020 Su ............................ G06N 3/08
2021/0065000 A1* 3/2021 Song ...................... G06V 10/82

FOREIGN PATENT DOCUMENTS

JP 2020186938 A * 11/2020
JP 2021018483 A * 2/2021

OTHER PUBLICATIONS

JP-2020186938-A—English Translation (Year: 2020).*
JP-2021018483-A—English Translation (Year: 2021).*
A. C. Valente et al., "Print Defect Mapping with Semantic Segmentation," 2020 IEEE Winter Conference on Applications of Computer Vision (WACV), Snowmass, CO, USA, 2020, pp. 3540-3548, doi: 10.1109/WACV45572.2020.9093470. (Year: 2020).*

* cited by examiner

*Primary Examiner* — Sumati Lefkowitz
*Assistant Examiner* — Aaron Joseph Sorrin
(74) *Attorney, Agent, or Firm* — Venable LLP

(57) ABSTRACT

To reduce the number of times of regeneration or updating of a learned model while treating color fluctuations, the image processing apparatus according to the present disclosure generates a predicted image, which is an image predicting an output image corresponding to an input image, by using a learned model. Further, the image processing apparatus determines whether to update the learned model or update adjustment parameters for adjusting a pixel value of a target image without updating the learned model based on the output image and the predicted image.

13 Claims, 13 Drawing Sheets

IMAGE PROCESSING APPARATUS, IMAGE PROCESSING METHOD, AND STORAGE MEDIUM, WITH DETERMINING BETWEEN UPDATING LEARNED MODEL AND UPDATING ADJUSTMENT PARAMETERS FOR ADJUSTING PIXEL VALUE WITHOUT UPDATING LEARNED MODEL

BACKGROUND

Field

The present disclosure relates to a technique to generate image data using machine learning.

Description of the Related Art

For example, there is a technique to generate image data by using a learned model, which is taken as a reference in a case where a printed material is inspected. Japanese Patent Laid-Open No. 2020-186938 has disclosed a technique to automatically inspect or check a printed material by comparing image data generated by using a learned model generated by applying deep learning with scanned image data obtained by scanning an inspection-target printed material. Specifically, the learned model disclosed in Japanese Patent Laid-Open No. 2020-186938 estimates an image that is formed on a printed material by taking data corresponding to input image data to be input to an image forming apparatus for obtaining the printed material as an input and generates and outputs image data taken as a reference of inspection as estimation results.

Incidentally, as the image forming apparatus, one adopting the ink jet method of forming an image on a printing medium by ejecting ink from a plurality of nozzles and one adopting the electrophotographic method of forming an image on a printing medium by using a laser photosensitive member and charged toner are similarly used widely. For image formation by the electrophotographic method, it is known that the density or color appearance of a formed image changes (in the following, called "color fluctuations") depending on the remaining amount of toner within the apparatus or environmental conditions, such as the ambient temperature or humidity. Similarly, for image formation by the ink jet method, it is known that color fluctuations occur depending on the ink sticking to the periphery of the nozzle, aging of a piezo element, heater or the like controlling ink ejection, or environmental conditions, such as the ambient temperature or humidity. There is a case where the tint of an image generated by the learned model and the tint of an image generated on a printed material are different from each other due to the color fluctuations such as those. In this case, for example, despite that there is no problem of the visual tint in an image formed on a printed material, it may happen that the printed material is determined to be defective in the above-described inspection or check depending on the degree of color fluctuations.

SUMMARY

The image processing apparatus according to the present disclosure includes: one or more hardware processors; and one or more memories storing one or more programs configured to be executed by the one or more hardware processors, the one or more programs including instructions for: generating a predicted image, which is an image predicting an output image corresponding to an input image, by using a learned model; and determining whether to update the learned model or update adjustment parameters for adjusting a pixel value of a target image without updating the learned model based on the output image and the predicted image.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

In a case where an image treating color fluctuations is generated by a learned model, with the technique disclosed in Japanese Patent Laid-Open No. 2020-186938, it becomes necessary to generate a new learned model by using a scanned image after color fluctuations or update the learned model by performing additional learning for the existing learned model. However, the generation or updating of the learned model requires a tremendous amount of calculation or time.

Embodiment 1

<Configuration of Image Processing System>

Figure 1A:
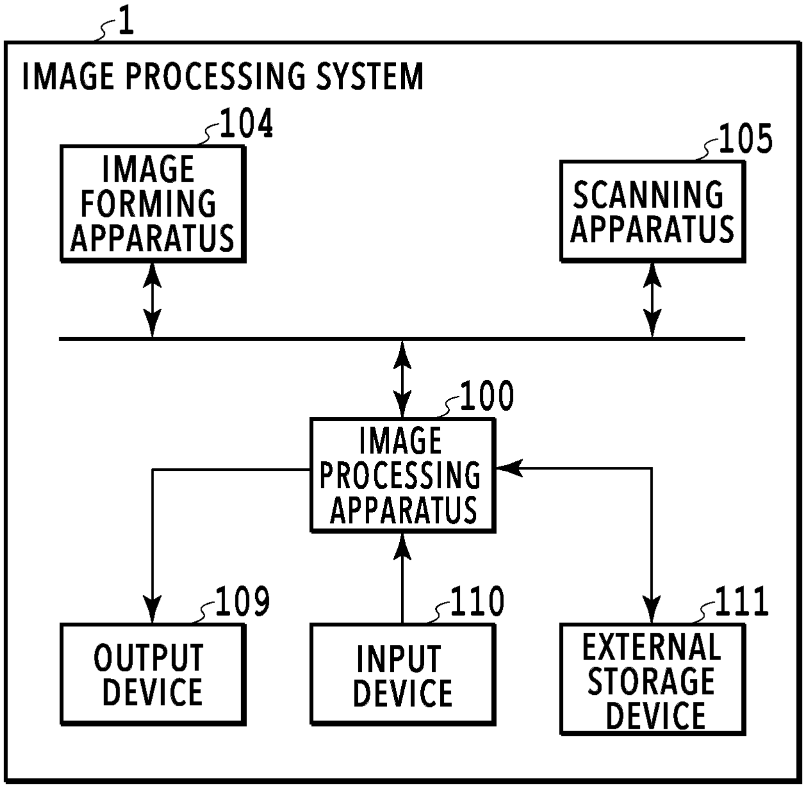
FIG. 1A is a block diagram showing one example of a configuration of an image processing system according to Embodiment 1 and FIG. 1B is a block diagram showing one example of a hardware configuration of an image processing apparatus according to Embodiment 1.

FIG. 1A is a block diagram showing one example of the configuration of an image processing system 1 according to Embodiment 1. The image processing system 1 has an image processing apparatus 100, an image forming apparatus 104, and a scanning apparatus 105 and the image processing apparatus 100, the image forming apparatus 104, and the scanning apparatus 105 are connected so as to be capable of communicating with one another. Further, to the image processing apparatus 100, an output device 109, an input device 110, and an external storage device 111 are connected. The function of each of the image processing apparatus 100, the image forming apparatus 104, the scanning apparatus 105, the output device 109, the input device 110, and the external storage device 111 will be described later.

<Hardware Configuration of Image Processing Apparatus>

Figure 1B:
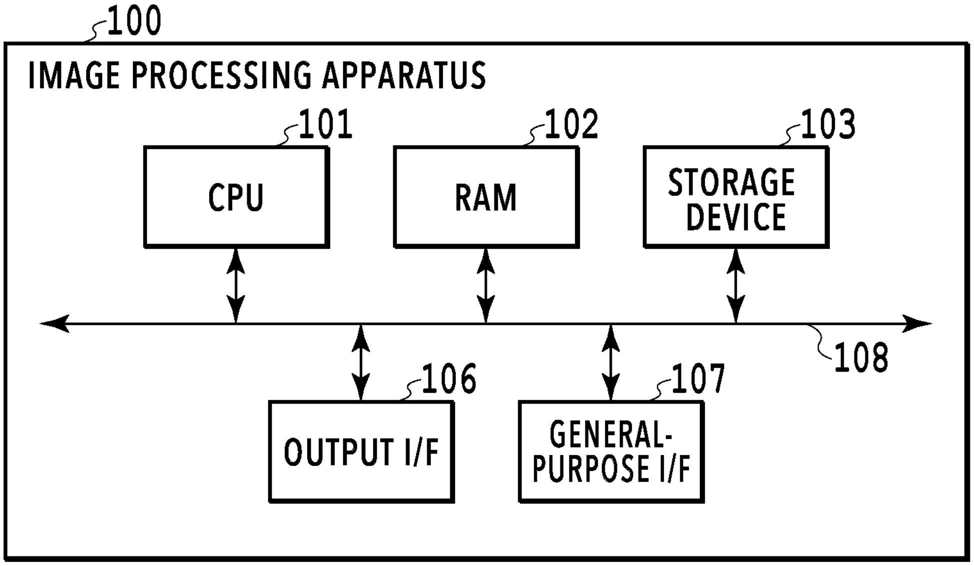

FIG. 1B is a block diagram showing one example of the hardware configuration of the image processing apparatus 100 according to Embodiment 1. The image processing apparatus 100 has a CUP 101, a RAM 102, a storage device 103, an output interface (I/F) 106, a general-purpose interface (I/F) 107, and a main bus 108. The output device 109 is connected to the image processing apparatus 100 via the output I/F 106, and the input device 110 and the external storage device 111 are connected to the image processing apparatus 100 via the general-purpose I/F 107, respectively.

The CPU (Central Processing Unit) 101 is a processor that comprehensively controls each unit within the image processing apparatus 100. Here, explanation is given on the assumption that the CUP 101 controls the whole image processing apparatus 100, but the CPU 101 may include a plurality of processors and the whole image processing apparatus 100 may be controlled by each processor sharing the processing. Further, it may also be possible to perform part of the control processing of the CPU 101 by hardware, such as an ASIC (application specific integrated circuit) or an FPGA (Field Programmable Gate Array). The RAM (Random Access Memory) 102 functions as a main storage device, a work area and the like of the CPU 101. The storage device 103 stores programs that are executed by the CPU 101, data that is used at the time of execution of programs, and the like.

The output I/F 106 is an image output interface, such as DVI (Digital Visual Interface). The output device 109 connected via the output I/F 106 is, for example, a liquid crystal display and functions as a user interface presenting the state of each apparatus of the image processing system 1, such as the image processing apparatus 100, the image forming apparatus 104, and the scanning apparatus 105. The general-purpose I/F 107 is a bus interface, such as USB (Universal Serial Bus) or IEEE (Institute of Electrical and Electronics Engineers) 1394. The image processing apparatus 100 receives information on the operation (instructions) by a user from the input device 110, such as a keyboard or a mouse, connected to the image processing apparatus 100 via the general-purpose I/F 107. Further, the image processing apparatus 100 is connected to the external storage device 111 via the general-purpose I/F 107 and it is possible for a user to cause the external storage device 111 to store data, such as a log, cause the image processing apparatus 100 to obtain desired data from the external storage device 111, and so on.

The main bus 108 connects each piece of hardware of the image processing apparatus 100 so as to be capable of communication. The hardware configuration of the image processing apparatus 100 is not limited to the above-described configuration. For example, the image forming apparatus 104 or the scanning apparatus 105 may be connected to the image processing apparatus 100 via an I/F, such as the general-purpose I/F 107, and the above-described external device, such as the output device 109, may exist inside the image processing apparatus 100 via the main bus 108. Further, the output device 109 and the input device 110 may be integrated into one unit as, such as a touch panel display. Furthermore, the image processing apparatus 100 may have an I/F for connecting to an external network and may be configured so as to be capable of performing the transmission and reception of information with the external network via the I/F. The configuration of the image processing apparatus 100 may be one having a GPU (Graphics Processing Unit), which is a processor specialized in high-speed parallel calculation, and in which part of the control processing of the CPU 100 is performed by the GPU.

<Function of Each Apparatus>

The image forming apparatus 104 forms an image on a printing medium, such as a printing sheet, based on a received print job. In the following, as one example, explanation is given by assuming that the forming method of an image in the image forming apparatus 104 is the ink jet method. The forming method of an image in the image forming apparatus 104 may be the electrophotographic method or another method. The scanning apparatus 105 obtains a scanned image by scanning an image formed on a printing medium. The data of the scanned image (in the following, called "scanned data") obtained by the scanning apparatus 105 is transmitted to the image processing apparatus 100. The scanned data is data representing the color of each pixel in the scanned image and the density of the color. In the following, as one example, explanation is given by assuming that the scanning apparatus 105 is an inline scanner. The function of the image processing apparatus 100 will be described later.

<Hardware Configuration of Image Forming Apparatus>

FIG. 2A to FIG. 2D are diagrams schematically showing one example of the hardware configuration of the image forming unit in the image forming apparatus 104 according to Embodiment 1. As described above, the image forming apparatus 104 in the present embodiment adopts the ink jet method of forming an image on a printing medium by ejecting ink, which is a color material, from nozzles onto the printing medium. In the present embodiment, it is assumed that for the formation of an image by the image forming apparatus 104, inks of four colors of black (K), cyan (C), magenta (M), and yellow (Y) are used.

Figure 2B:
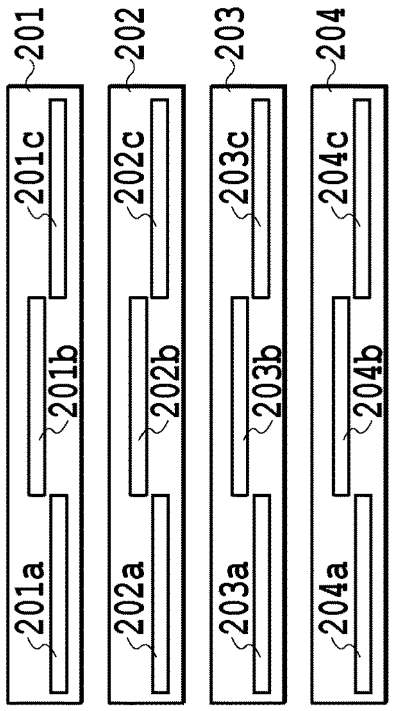
FIG. 2A to FIG. 2D are diagrams showing one example of a hardware configuration of an image forming unit in an image forming apparatus according to Embodiment 1.
Figure 2C:
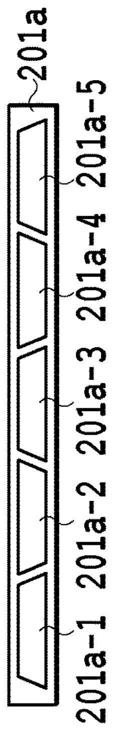
Figure 2D:
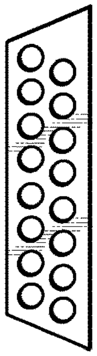
Figure 2A:
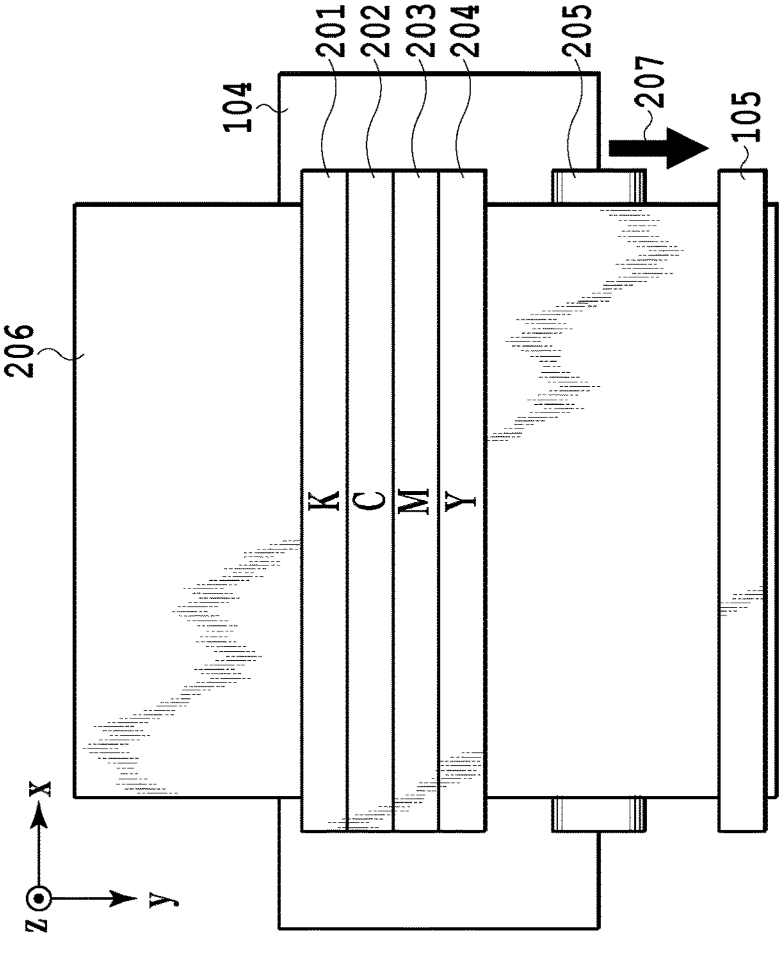

As shown in FIG. 2A as one example, the image forming apparatus 104 comprises print heads 201 to 204. Each of the print heads 201 to 204 is fixed at the position shown in FIG. 2A and ejects each ink of K, C, M, or Y to the range corresponding to the width of a printing medium 206. The image forming apparatus adopting the ink ejection method such as this is generally called "full-line type". Each of the print heads 201 to 204 includes a combination of a plurality of head modules. FIG. 2B shows one example of the configuration of the print heads 201 to 204. As shown in FIG. 2B, for example, the print head 201 includes a combination of head modules 201*a*, 201*b*, and 201*c*. The head modules 201*a*, 201*b*, and 201*c* are arranged side by side in the main scanning direction in the state where the adjacent head modules are arranged at positions different from each other in the sub scanning direction. Similarly, the print head 202 includes a combination of head modules 202*a*, 202*b*, and 202*c* and the print head 203 includes a combination of head modules 203*a*, 203*b*, and 203*c*, respectively. Further, similarly, the print head 204 includes a combination of head modules 204*a*, 204*b*, and 204*c*.

Further, each head module includes a plurality of chip modules. FIG. 2C shows the configuration of the head module 201*a* as one example of the configuration of each head module. The head module 201*a* includes chip modules 201*a*-1 to 201*a*-5. In the following, explanation is given by assuming that each chip module is connected to the substrate independent of one another. Each chip module internally comprises a plurality of nozzles (nozzle is also referred to as "ejection port"). FIG. 2D shows one example in a case where the chip module is viewed from the side of the printing medium 206. As shown in FIG. 2D, for example, each chip module comprises 16 nozzles in total across two rows. The number of nozzles is not limited to 16 and may be 15 or less or 17 or more. The nozzles are arranged so that whose arrangement resolution is equal to the print resolution of the image forming apparatus and the print resolution is 1,200 dpi (dot per inch) or the like.

The printing medium 206 is conveyed in the direction (direction from top toward bottom in FIG. 2A) indicated by an arrow 207 shown in FIG. 2A by a conveyance roller 205 (and another roller not shown schematically in FIG. 2A) rotating by a driving force of a motor, not shown schematically. While the printing medium 206 is conveyed and passes through the fixed positions of the print heads 201 to 204, by ink in accordance with the print job being ejected from a plurality of nozzles arranged in each of the print heads 201 to 204, an image is formed on the printing medium 206. In a case where ink is ejected one time from each nozzle in accordance with the print job among the plurality of nozzles, an image corresponding to one raster (also called "row") corresponding to the nozzle column is formed. By the image forming apparatus 104 repeating the ink ejection operation at high speed while conveying the printing medium, the whole image is formed on the printing medium.

The image forming apparatus 104 is not limited to the full-line type apparatus adopting the ink jet method. For example, the image forming apparatus 104 may be a so-called serial type apparatus adopting the ink jet method, which forms an image while moving the print head in the main scanning direction. Further, the image forming apparatus 104 may be an apparatus adopting the electrophotographic method of forming an image by using a laser photosensitive member and charged toner, or an apparatus adopting the thermal transfer method of vaporizing solid ink by heat and transferring the ink onto a printing medium. Furthermore, the image forming apparatus 104 may be an apparatus adopting the offset printing method of performing printing for a printing medium with ink attached to a plane via an intermediate transfer body.

In FIG. 2A, the scanning apparatus 105 is also shown schematically. The scanning apparatus 105 shown as one example in FIG. 2A is a line sensor having a length corresponding to the width of the printing medium and installed on the downstream side of the print heads 201 to 204. It is possible for the scanning apparatus 105 to sequentially capture the printing medium that is conveyed as RGB information and obtain as two-dimensional scanned data including pixel values of three channels of RGB.

The scanning apparatus 105 is not limited to the line sensor as described above and for example, may be one comprising a carriage for moving a sensor in the main scanning direction and capturing an arbitrary area of a printing medium. Further, the scanning apparatus 105 may be one comprised as an external apparatus of the image forming apparatus 104 and obtaining a value in the CIE L*a*b* (in the following, simply called "Lab") color space by measuring a printing medium on which an image is formed. In this case, the scanning apparatus 105 includes a so-called colorimeter or a measuring instrument for quantitatively determining the color of a light source and object, such as a spectrodensitometer. The Lab color space is one example of a device-independent color system and the scanning apparatus 105 may be one measuring or obtaining a value of another color system, such as the XYZ color system represented by tri-stimulus values XYZ of an object.

<Function Configuration of Image Forming Apparatus>

Figure 3:
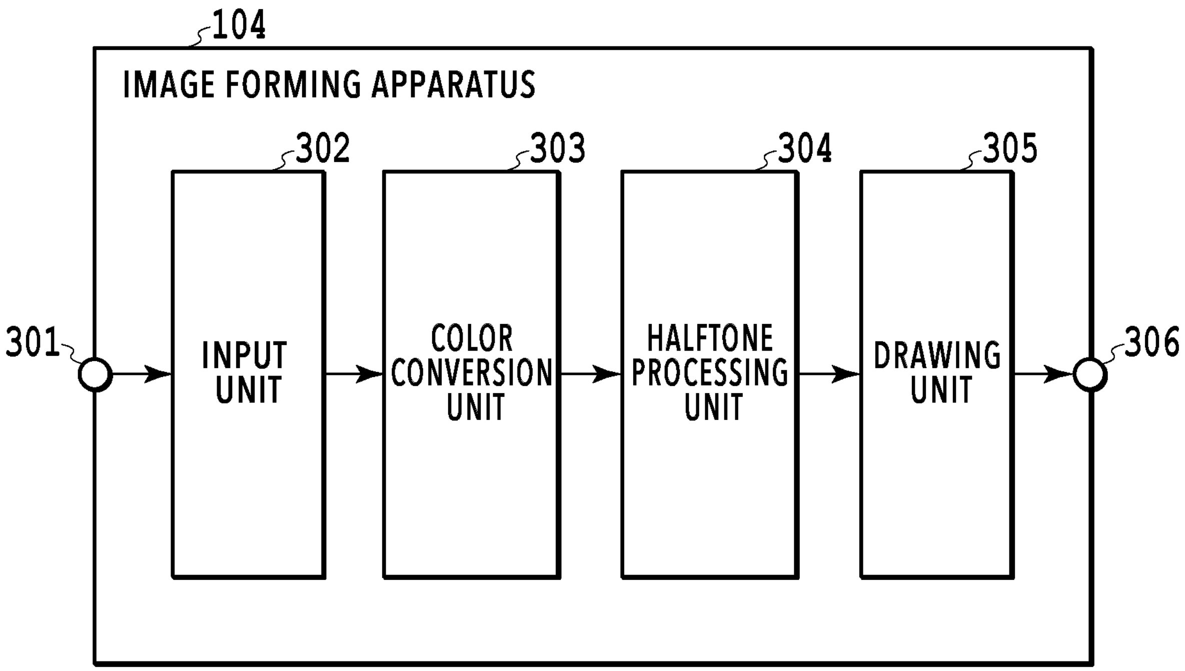
FIG. 3 is a block diagram showing one example of a function configuration of the image forming apparatus according to Embodiment 1.

With reference to FIG. 3, image forming processing in the image forming apparatus 104 is explained. FIG. 3 is a block diagram showing one example of the function configuration of the image forming apparatus 104 according to Embodiment 1. The image forming apparatus 104 has an input unit 302, a color conversion unit 303, a halftone processing unit 304, and a drawing unit 305 as the function configuration. Terminals 301 and 306 shown in FIG. 3 are input/output terminals of data. The input unit 302 receives a print job via the terminal 301, which is transmitted from an external apparatus, such as the image processing apparatus 100. In the following, it is assumed that the data format of an input image included in the print job received by the input unit 302 is represented by pixel values of three channels of RGB whose value of each pixel includes eight bits.

The color conversion unit 303 receives data of an input image included in the print job received by the input unit 302 and converts each pixel value (RGB values) of the input image into a value in the color space corresponding to the ink color of the image forming apparatus 104 by referring to profile information included in the data of the input image. For example, for this conversion, a lookup table (LUT) for color conversion is used, which is created in advance for each profile. In the following, explanation is given by assuming that the color conversion unit 303 converts the data of the input image represented by 8-bit pixel values of three channels of RGB into data of an image (in the following, called "CMYK image data") represented by 8-bit pixel values of four channels of CMYK.

The halftone processing unit 304 generates halftone image data by performing halftone processing for the CMYK image data after the color conversion by the color conversion unit 303. The halftone processing is processing to convert CMYK image data into the number of tones that the image forming apparatus 104 can directly represent, such as two values indicating whether or not to eject ink for each ink of CMYK and in order to generate halftone image data, it is possible to use the technique, such as the error diffusion method or the dither method. In the following, explanation is given by assuming that halftone image data is represented in the binary format of four channels of CMYK. The drawing unit 305 forms an image by controlling the ejection of ink onto a printing medium from each of the print heads 201 to 204 and drawing the image corresponding to the input image on the printing medium based on the halftone image data generated by the halftone processing unit 304. Further, the drawing unit 305 outputs halftone image data and information indicating the record of the control via the terminal 306.

<Function of Image Processing Apparatus>

The image processing apparatus 100 according to the present embodiment performs inspection processing in a case where the printing medium on which an image is formed in the image forming apparatus 104 (in the following, called "printed material") is delivered to the orderer of the printed material. Here, the inspection is for guaranteeing that there is no defect in the printed material and there is no problem of the quality of the printed material. The inspection processing is performed automatically by comparing the scanned data obtained by scanning the inspection-target printed material in the scanning apparatus 105 with the reference data used as the reference of the inspection, which is taken in advance to be the data of printed material without defect. The data of the image taken to be the base of the reference data according to the present embodiment is generated automatically by using a learned model.

<About Learned Model>

The learned model according to the present embodiment (in the following, simply described as "learned model") is explained. The learned model is configured, for example, by a convolutional neural network (in the following, called "CNN") used in the image processing technique in which deep learning is applied. The CNN is a technique to repeatedly apply unit processing in which nonlinear operation is performed for image data after images are convoluted (or after transposed convolution is performed) by using a filter generated by learning. A set of one or more nodes performing the unit processing is called layer. The above-described filter is also called local receptive field. Data of images and the like obtained by performing nonlinear operation after convoluting images by using the filter is called a feature map and in accordance with the order of arranged layers, called the feature map in the nth (n is a natural number) layer, the feature map in the filter in the nth layer, and the like. Further, the CNN repeating the convolution using the filter and the nonlinear operation m times (m is a natural number larger than or equal to n) is called CNN having an m layers network structure, and the like.

In a case where the image data that is input to the learned model has a plurality of color channels, such as RGB, or in a case where the feature map includes a plurality of channels, that is, in a case where the input data to the layer is multi channels, the number of filters in accordance with the number of channels is necessary. In the following, explanation is given by referring to a set of filters corresponding to each channel as a filter set. One filter set outputs one feature map. Each layer has the number of filter sets corresponding to the number of feature maps to be output. That is, the convolution filter in a certain layer is represented by a four-dimensional array including the number of channels of the image data to be input or the feature map and the number of channels of the feature map to be output, in addition to information indicating the vertical and horizontal sizes of the image data to be input or the feature map. It is possible to represent the processing in each layer by a formula in which the addition operation of bias is added to the value after convolution. By generalization, it is possible to formulate this as formula 1 below.

$$X_n^{(l)} = f\left(\sum_{k=1}^{K} W_n^{(l,k)} * X_{n-1}^{(l,k)} + b_n^{(l)}\right) \qquad \text{(formula 1)}$$

In formula 1, $W_n$ is the filter in the nth layer, $b_n$ is the bias in the nth layer, f ( ) is nonlinear operation, $X_n$ is the feature map in the nth layer, and * is the convolution operator. By (1, k) at the right shoulder, it is indicated that the channel is the kth channel in the Ith filter or feature map (1 is a natural number less than or equal to L, which is the number of output channels in this layer). In formula 1, K is the number of channels to be input to this layer. The filter and bias are generated by learning, to be described later, and also called together "network parameters". As the nonlinear operation f ( ) the sigmoid function, ReLU (Rectified Linear Unit), the hyperbolic tangent function (tanh) or the like is used. Further, the nonlinear operation f ( ) is also called the activation function. It may also be possible for each layer of the CNN network to perform processing by taking the feature map output from a distant layer as the input, not only taking the feature map output from the immediately previous layer. As the network having the structure such as this, U-Net, ResNet or the like is known as one example.

In the deep learning, an attempt is made to improve the accuracy of the estimation processing by generally designing the structure of the CNN to have multi layers (deep layer) so that the convolution by the filter is performed many times. The reason the accuracy of the estimation processing improves by the multilayer CNN is that, in short, by the nonlinear operation being repeated many times, it is possible to represent the nonlinear relationship between input and output by the stack of the nonlinear operation of each layer.

The learning method of the CNN is explained. The learning of the CNN is performed by using learning data including a pair of data of an input image and data of an output image (correct answer image). The learning of the CNN is generating a filter and a bias, that is, values of network parameters, with which it is possible to convert the data of an input image into the data of a correct answer image corresponding to the input image by using learning data. First, as the network parameters of the CNN, arbitrary initial values are given. The learning of the CNN is performed by updating the network parameters so as to minimize the objective function as expressed by next formula 2 for the learning data.

$$L(\theta) = \frac{1}{n}\sum_{i=1}^{n} \|F(X_i;\theta) - Y_i\|_2^2 \qquad \text{(formula 2)}$$

In formula 2, L ( ) is the objective function, that is, the loss function measuring an error between the correct answer and its prediction. Further, θ is the network parameter (filter and bias), that is, the variable of the loss function L ( ). $X_i$ is the data of the ith input image and $Y_i$ is the data of the ith correct answer image. Further, F ( ) is the function representing together the operations (formula 1 described above), such as nonlinear operation, which are performed in each layer of the CNN. $\|x\|_2$ is L2 norm of x. Further, n is the number of pieces of the learning data used for learning, that is, the number of input images. Here, n may be the total number of pieces of the learning data, or may be the number of pieces of part of the learning data, which are extracted randomly from all the pieces of the learning data. The reason is that the number of pieces of the learning data is generally large.

As above, it is also possible to update the network parameters by a method, such as Mini-Batch Stochastic Gradient Descent, by using part of the learning data extracted randomly. Mini-Batch Stochastic Gradient Descent is a method of updating the network parameters by using the gradient calculated from part of the learning data extracted randomly, in place of calculating the loss by using all the pieces of the learning data. According to Mini-Batch Stochastic Gradient Descent, it is possible to reduce the amount of calculation in learning because the network parameters converge in a smaller number of times of learning.

By the above definition, it can be said that formula 2 expresses the average of L2 norm errors in a case where the input image data $X_i$ is input to the network F ( ) whose network parameter is θ and the obtained predicted value is compared with the correct answer image data $Y_i$. The objective function shown in formula 2 is one example and the objective function may be one whose term is changed, to which a term is added, and so on, in accordance with the feature desired to be simulated.

The updating of the network parameter θ is performed by updating the value in the direction in which the error is expected to be made small in order while going back in the network structure based on the derivative (gradient) for an error L of each parameter, which is calculated at the same time as the parameter updating. The updating method such as this is called error backpropagation method. As this updating method, that is, as the method of minimizing the objective function, the momentum method, the AdaGrad method, the AdaDelta method, the Adam method and the like are known. As the minimizing method, basically, any method may be used. It is known that there is a difference in convergency for each minimizing method used, and therefore, there occurs a difference in learning time.

As results of repeating learning a sufficient number of times by using learning data, network parameters making small the output value of the objective function are obtained. That is, a learned model of the CNN is generated, which outputs data of the predicted image similar to the data of the correct answer image by acting on the data of the input image of the learning data. It is also possible to use the learned model thus generated as a converter converting the data of the input data into data of the correct answer image also for the input image data other than the learning data.

In the present embodiment, explanation is given by assuming that a learned model is generated in advance by learning using the learning data as in the following and the generated learned model is retained in the image processing apparatus 100. The data of the input image included in the learning data is halftone image data and the data of the correct answer image is scanned data obtained by the scanning apparatus 105 scanning a printing medium on which the image forming apparatus 104 forms an image based on the halftone image data. At this time, the learned model is a model converting a binary image of four channels of CMYK into an 8-bit image of three channels of RGB.

It is possible for the learned model to generate reference data taken as a reference of inspection by utilizing halftone image data generated by the halftone processing unit 304 based on the data of an arbitrary image input to the image forming apparatus 104 as the data of the input image for input. The data of the input image is not limited to the binary halftone image data of four channels of CMYK and may be 8-bit image data of four channels of CMYK. This is also the same with the output image data. As the learned model, an aspect is considered, for example, such as an aspect in which a learned model whose quality is guaranteed through sufficient verification by a manufacturer of the image processing apparatus 100 or the image processing system 1.

<Function Configuration of Image Processing Apparatus>

Figure 4:
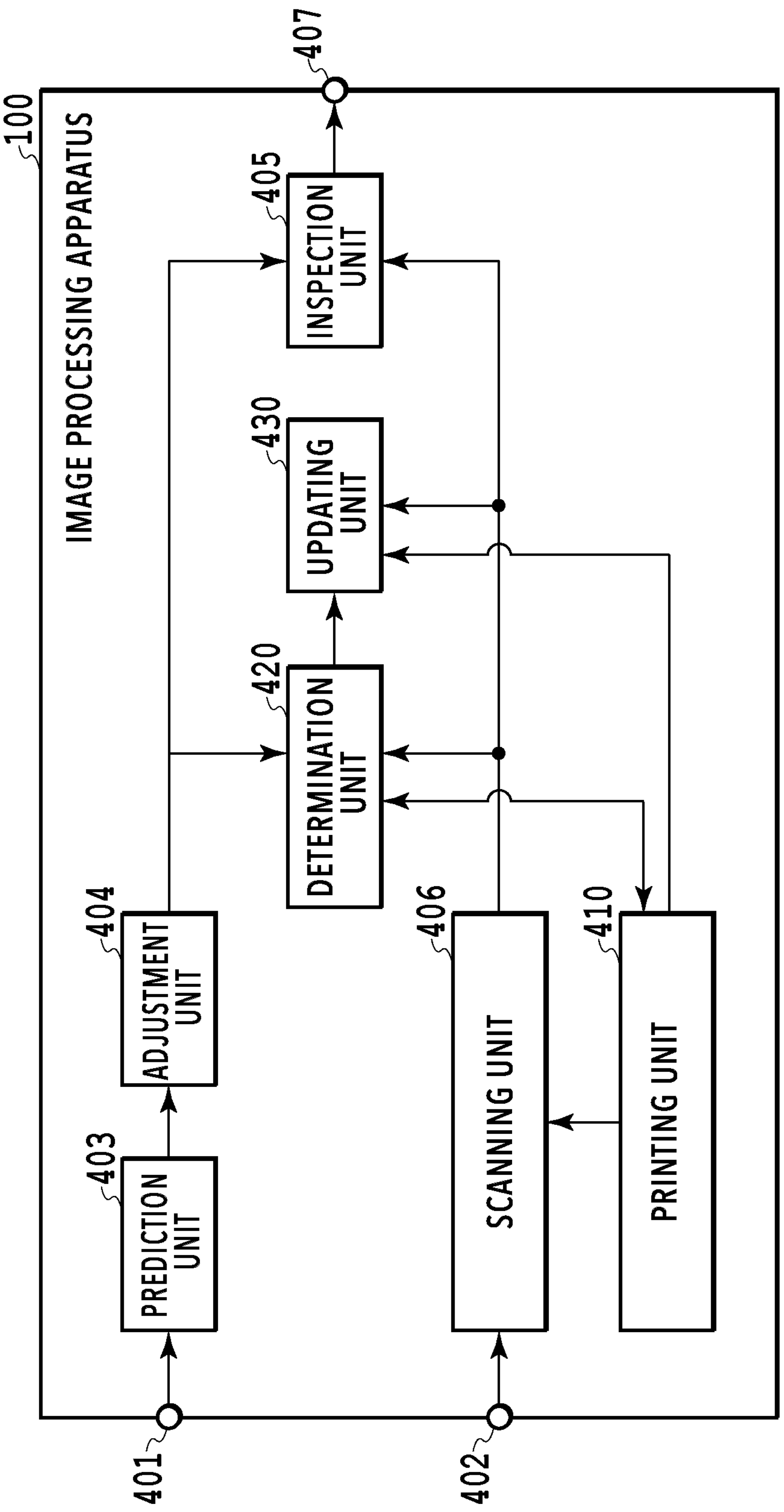
FIG. 4 is a block diagram showing one example of a function configuration of the image processing apparatus according to Embodiment 1.

With reference to FIG. 4, the function configuration of the image processing apparatus 100 is explained. FIG. 4 is a block diagram showing one example of the function configuration of the image processing apparatus 100 according to Embodiment 1. The image processing apparatus 100 has a prediction unit 403, an adjustment unit 404, an inspection unit 405, a scanning unit 406, a printing unit 410, a determination unit 420, and an updating unit 430 as the function configuration. Terminals 401, 402, and 407 are input/output terminals. The prediction unit 403 inputs halftone image data obtained via the terminal 401 to the above-described learned model and obtains predicted image data that is output from the learned model. The predicted image data is, for example, 8-bit image data of three channels of RGB.

The adjustment unit 404 generates reference image data (in the following, called "reference data") by adjusting the pixel value of the predicted image data obtained by the prediction unit 403. In the present embodiment, the adjustment processing in the adjustment unit 404 refers to the processing of so-called gamma correction to convert the pixel value into a new pixel value for each channel of RGB. The reference data generated in the adjustment unit 404 is transmitted to the inspection unit 405. To the terminal 401, in a case where it becomes necessary to newly generate reference data, a signal to that effect and binary halftone image data of four channels of CMYK are input as input image data. In a case where the signal and binary halftone image data are input to the terminal 401, the prediction unit 403 and the adjustment unit 404 perform the above-described processing.

The printing unit 410 causes the image forming apparatus 104 to output a calibration chart, a learning chart and the like, to be described later, as a printed material by controlling the image forming apparatus 104. Details of the processing of the printing unit 410 will be described later. The scanning unit 406 obtains scanned data by controlling the scanning apparatus 105 and transmits the obtained scanned data to the inspection unit 405. To the terminal 402, a signal is input in synchronization with the image formation in the image forming apparatus 104, and the scanning unit 406 performs the above-described processing in accordance with the signal.

The inspection unit 405 inspects the presence/absence of a defect, scratching or the like in a printed material corresponding to the scanned data by comparing the reference data with the scanned data. For example, first, the inspection unit 405 performs position adjustment to correct a deviation in position, inclination or the like in the image between the reference data and the scanned data. Following this, the inspection unit 405 makes an inspection by finding a difference between the reference data and the scanned data after the position adjustment and determining whether or not there exists a difference indicating a defect, scratching or the like larger than or equal to a predetermined threshold value by filter processing or the like. The inspection unit 405 outputs a control signal indicating inspection results via the terminal 407. In accordance with the output control signal, control to change the output destination of a printed material depending on whether the printed material has passed the inspection or failed the inspection, control to count the number of times the printed material has passed the inspection or the number of times the printed material has failed the inspection, control to give a notification to a user as needed, and so on, are performed. Due to this, it is made possible to perform the delivery work of a printed material efficiently.

The determination unit 420 determines whether to update the learned model or update only the correction parameters (in the following, called "adjustment parameters") for gamma correction in the adjustment unit 404 without updating the learned model based on the reference data and the scanned data. Details of the processing of the determination unit 420 will be described later. The updating unit 430 updates at least one of the learned model and the adjustment parameters based on the determination results by the determination unit 420. Details of the processing of the updating unit 430 will be described later.

<Updating Processing of Learned Model and Adjustment Parameters>

Generally, there is a case where fluctuations occur in coloring or color density in an image formed on a printing medium by the image forming apparatus due to the physical factor, such as the member configuring the image forming apparatus 104, or the environmental factor, such as temperature or humidity around the image forming apparatus. In the following, explanation is given by referring to the fluctuations in coloring or color density as "color fluctuations". For example, in the image formation by the ink jet method, even though the same image is formed, there is a case where the color fluctuations occur in the image formed on a printing medium due to aging of a piezo element, heater or the like which controls ink ejection, or due to a change in temperature, humidity or the like. This is the same also in the image formation by another method, such as the electrophotographic method. The color fluctuations as above hinder an appropriate inspection of the presence/absence of a defect, scratching or the like described above in a range in which a visual problem does not arise. The image processing apparatus 100 according to the present embodiment generates reference data following the color fluctuations. Due to this, according to the image processing apparatus 100, it is possible to make an appropriate inspection.

Figure 5A:
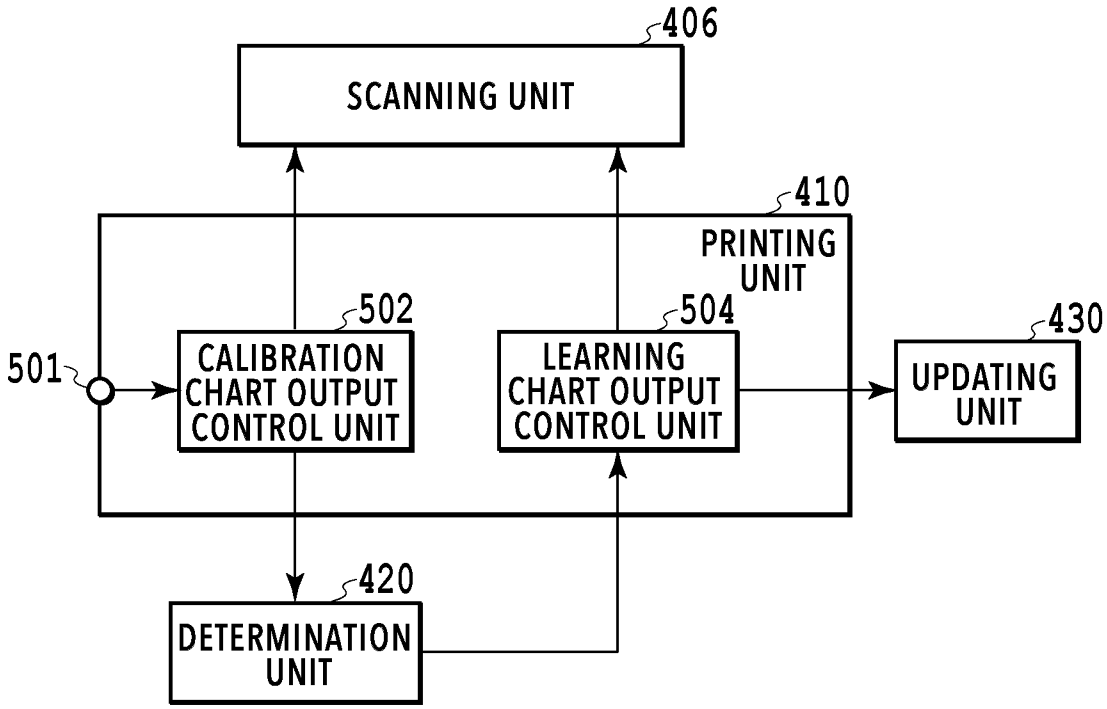
FIG. 5A is a block diagram showing one example of a function configuration of a printing unit according to Embodiment 1 and FIG. 5B is a block diagram showing one example of a function configuration of an updating unit according to Embodiment 1.
Figure 5B:
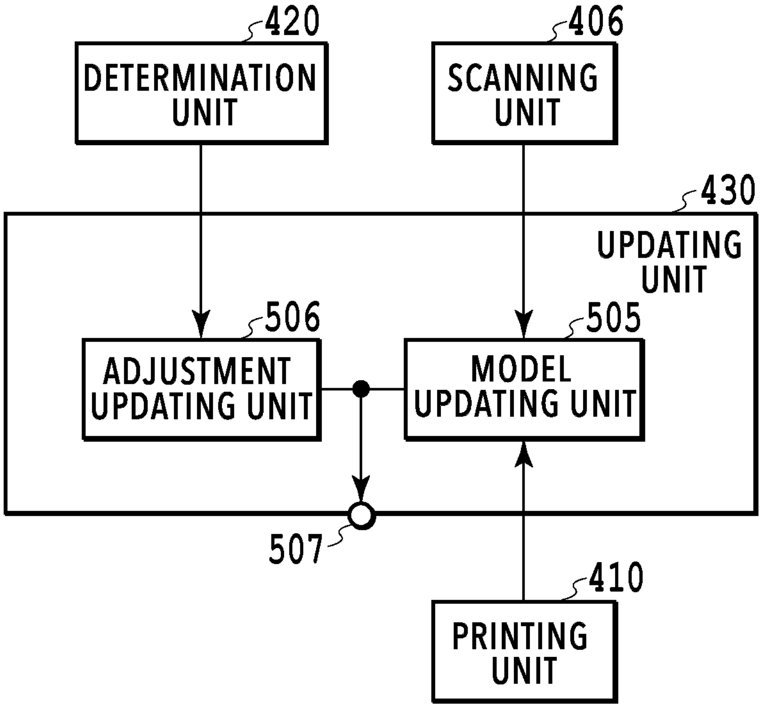

FIG. 5A and FIG. 5B are block diagrams showing one example of the function configuration inside the printing unit 410 and that inside the updating unit 430, respectively, according to Embodiment 1. The printing unit 410 has a calibration chart output control unit 502 and a learning chart output control unit 504, and the updating unit 430 has an adjustment updating unit 506 and a model updating unit 505. Terminals 501 and 507 are input/output terminals. The calibration chart output control unit 502 starts the control of the image forming apparatus 104 by taking the control signal that is input via the terminal 501 as a trigger and causes the image forming apparatus 104 to output a calibration chart. Specifically, the calibration chart output control unit 502 transmits image data (in the following, called "calibration image data") for causing the image forming apparatus 104 to output a calibration chart to the image forming apparatus 104. Due to this, the image forming apparatus 104 outputs a calibration chart. Further, the calibration chart output control unit 502 transmits a signal (in the following, called "calibration chart output signal") to the effect that the calibration chart output control unit 502 causes the image forming apparatus 104 to output a calibration chart to the scanning unit 406. Furthermore, the calibration chart output control unit 502 transmits calibration halftone image data corresponding to the calibration image data to the determination unit 420.

Here, the control signal that the calibration chart output control unit 502 receives via the terminal 501 is a control signal indicating the start of execution of processing (in the following, called "calibration processing") to determine whether or not the updating of the learned model or the adjustment parameters is necessary. The calibration processing is performed in a case where instructions to perform the calibration processing are received from a user, or before the start of the formation of an image in the delivery-target printed material, or at predetermined timing, such as during the formation of images in a plurality of printed materials.

The scanning unit 406 causes the scanning apparatus 105 to scan the calibration chart by controlling the scanning apparatus 105 based on the calibration chart output signal received from the calibration chart output control unit 502. The scanning unit 406 obtains the scanned data obtained by the scanning as calibration scanned data. The method of obtaining calibration scanned data in the scanning unit 406 is the same as the method of obtaining scanned data corresponding to the delivery-target printed material.

The determination unit 420 transmits the calibration halftone image data received from the calibration chart output control unit 502 to the prediction unit 403. The prediction unit 403 inputs the calibration halftone image data received from the determination unit 420 to the learned model and obtains data of a predicted image (in the following, called "calibration predicted image") corresponding to the calibration scanned data, which is generated by the learned model, as calibration reference data. The determination unit 420 determines whether to perform the updating of the learned model used by the prediction unit 403 or to perform the updating of the adjustment parameters used by the adjustment unit 404 based on the calibration scanned data obtained by the scanning unit 406 and the calibration reference data obtained by the prediction unit 403.

Here, the determination of whether to perform the updating of the adjustment parameters means to determine whether to perform the updating of only the adjustment parameters without performing the updating of the learned model. Further, the updating of the learned model means the updating of the network parameters in the learned model. In the present embodiment, explanation is given by assuming that the adjustment parameters used by the adjustment unit 404 are parameters indicating a one-dimensional gamma curve of each channel of three channels of RGB.

The learning chart output control unit 504, in a case where the determination results of the determination unit 420 are the updating of the learned model, receives a signal to that effect from the determination unit 420 and causes the image forming apparatus 104 to output a learning chart by controlling the image forming apparatus 104. Specifically, the learning chart output control unit 504 transmits image data (in the following, called "learning image data") for causing the image forming apparatus 104 to output a learning chart to the image forming apparatus 104.

Due to this, the image forming apparatus 104 outputs a learning chart. Further, the learning chart output control unit 504 transmits halftone image data (in the following, called "learning halftone image data") based on the learning image data to the model updating unit 505. Furthermore, the learning chart output control unit 504 transmits a signal to the effect that the learning chart output control unit 504 has output the learning chart to the scanning unit 406. The scanning unit 406 obtains the scanned data (in the following, called "learning scanned data") corresponding to the learning image data by causing the scanning apparatus 105 to perform scanning of the learning chart by controlling the scanning apparatus 105 based on the signal. The method of obtaining learning scanned data in the scanning unit 406 is the same as the method of obtaining scanned data corresponding to the delivery-target printed material.

The model updating unit 505 performs the updating of the learned model based on the learning halftone image data received from the learning chart output control unit 504 and the learning scanned data obtained by the scanning unit 406. The adjustment updating unit 506, in a case where the determination results of the determination unit 420 are the updating of the adjustment parameters, receives a signal to that effect from the determination unit 420 and performs the updating of the adjustment parameters. The model updating unit 505 and the adjustment updating unit 506, in a case where the updating is completed, output a signal to that effect via the terminal 507.

<Processing Flow of Image Processing Apparatus>

Figure 6:
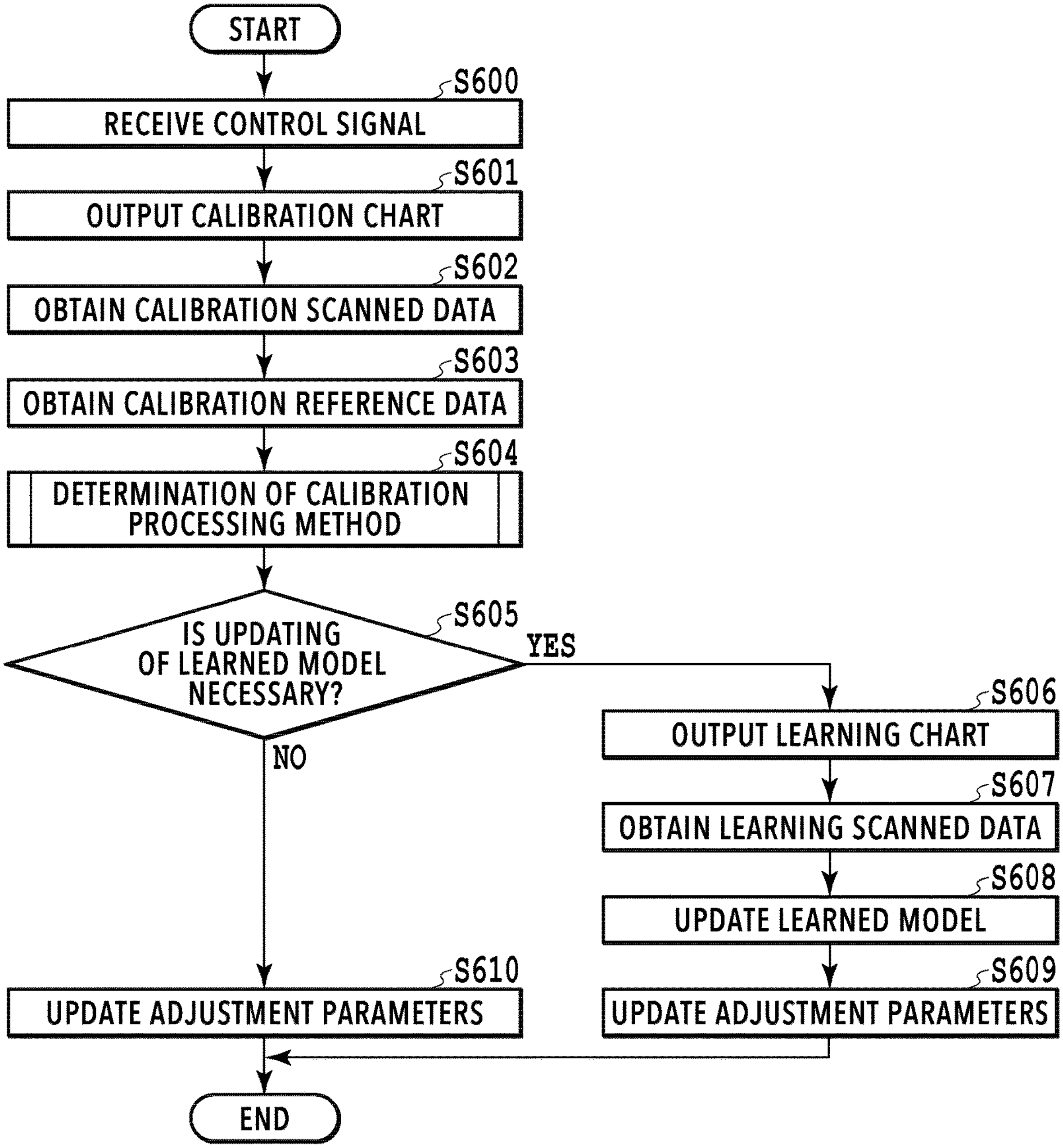
FIG. 6 is a flowchart showing one example of a processing flow of calibration processing in the image processing apparatus according to Embodiment 1.

FIG. 6 is a flowchart showing one example of a processing flow of calibration processing in the image processing apparatus 100 according to Embodiment 1. The CPU 101 implements the function of each unit described above by reading programs for performing the processing of the flowchart shown in FIG. 6 from the storage device 103 or the like and executing the programs. In the following explanation, a symbol "S" means a step (process). The processing in the flowchart shown in FIG. 6 is started in a case where the image processing apparatus 100 receives instructions to perform calibration processing from a user, or before the start of the formation of an image in the delivery-target printed material, or at predetermined timing, such as during the formation of images in a plurality of printed materials. First, at S600, the calibration chart output control unit 502 receives a control signal that is input via the terminal 501. Next, at S601, the calibration chart output control unit 502 causes the image forming apparatus 104 to output a calibration chart by controlling the image forming apparatus 104.

Figure 7B:
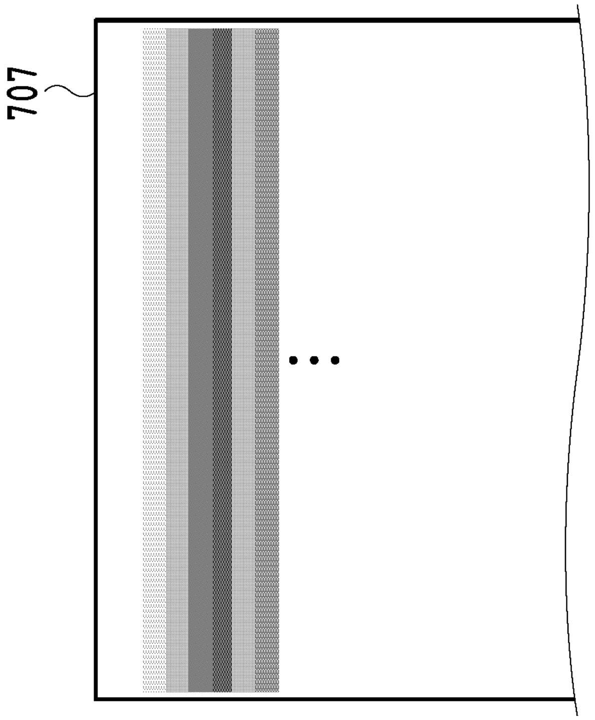
FIG. 7A and FIG. 7B are each a diagram showing one example of a calibration chart according to Embodiment 1.
Figure 7A:
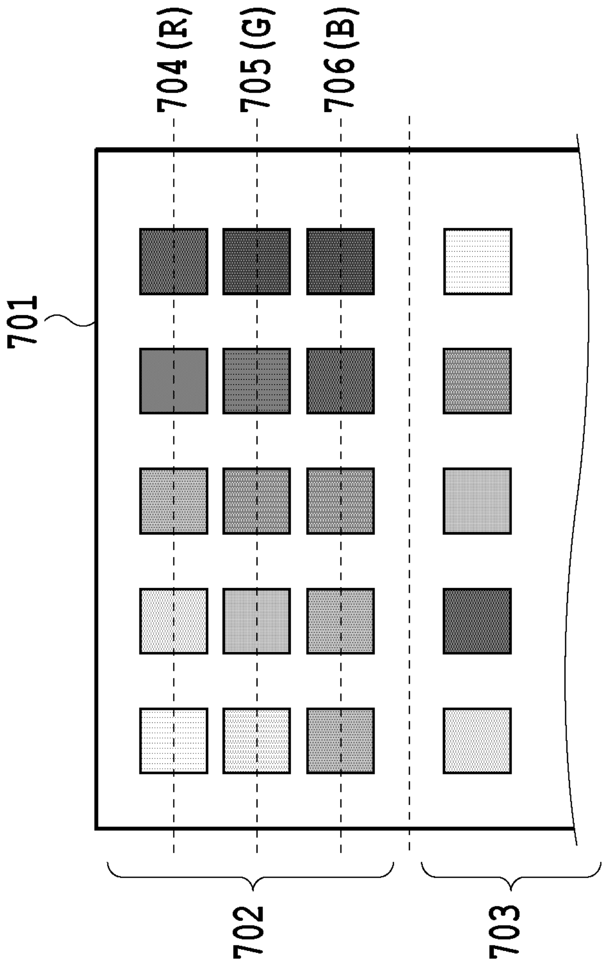

FIG. 7A and FIG. 7B are diagrams showing one example of a calibration chart 701 and one example of a calibration chart 707, respectively, according to Embodiment 1. In the calibration chart 701 shown in FIG. 7A, a one-dimensional characteristics obtaining area 702 and a mixed color characteristics obtaining area 703 are included. In each of rows 704 to 706 in the one-dimensional characteristics obtaining area 702, patches of the same hue of red (R) or the like are arranged so that the brightest patch is located at the leftmost position and the patch becomes darker toward the right side in FIG. 7A. In the following, explanation is given on the assumption that red (R) patches are arranged in the row 704, green (G) patches are arranged in the row 705, and blue (B) patches are arranged in the row 706, respectively. Further, in the following, explanation is given by referring to a plurality of patches arranged in the row 704 as a one-dimensional characteristics patch of red (R), a plurality of patches arranged in the row 705 as a one-dimensional characteristics patch of green (G), and a plurality of patches arranged in the row 706 as a one-dimensional characteristics patch of blue (B).

Further, in the mixed color characteristics obtaining area 703, a plurality of mixed color patches is arranged. The mixed color patch is a patch whose hue is different from that of the one-dimensional characteristics patch arranged in the one-dimensional characteristics obtaining area 702. Specifically, the one-dimensional characteristics patch is red, green, or blue, and therefore, it is a patch in which the pixel value of R, G, or B has the predominant pixel value, but the mixed color patch is a patch having an RGB pixel value ratio different from each of them. In other words, the mixed color patch is a patch whose ratio of each ink used to represent the patch is different. As one example of the patch color of the mixed color patch, there is orange, dark brown, purple or the like. In the mixed color characteristics obtaining area 703, it is not necessarily required to arrange a plurality of mixed color patches comprehensively including all the combinations of mixed colors, but it is preferable to arrange a plurality of mixed color patches for each predetermined range of a color area, such as hue or lightness, which typifies the color area thereof.

The calibration chart is not limited to the arrangement of the patches as in the calibration chart 701 shown in FIG. 7A. For example, the calibration chart may be one including patches whose patch width corresponds to the print width as shown in the calibration chart 707 shown in FIG. 7B, and which are horizontally elongated patches so that the characteristics of each nozzle of each of the print heads 201 to 204 are known.

After S601, at S602, the scanning unit 406 obtains calibration scanned data by controlling the scanning apparatus 105. Next, at S603, the prediction unit 403 inputs the calibration halftone image data to the learned model and obtains data of a calibration predicted image as calibration reference data. Next, at S604, the determination unit 420 determines the method of calibration processing, that is, whether it is necessary to perform the updating of the learned model or only the updating of the adjustment parameters is performed without the need to perform the updating of the learned model based on the calibration scanned data and the calibration reference data.

<Processing Flow of Determination Unit>

Figure 8:
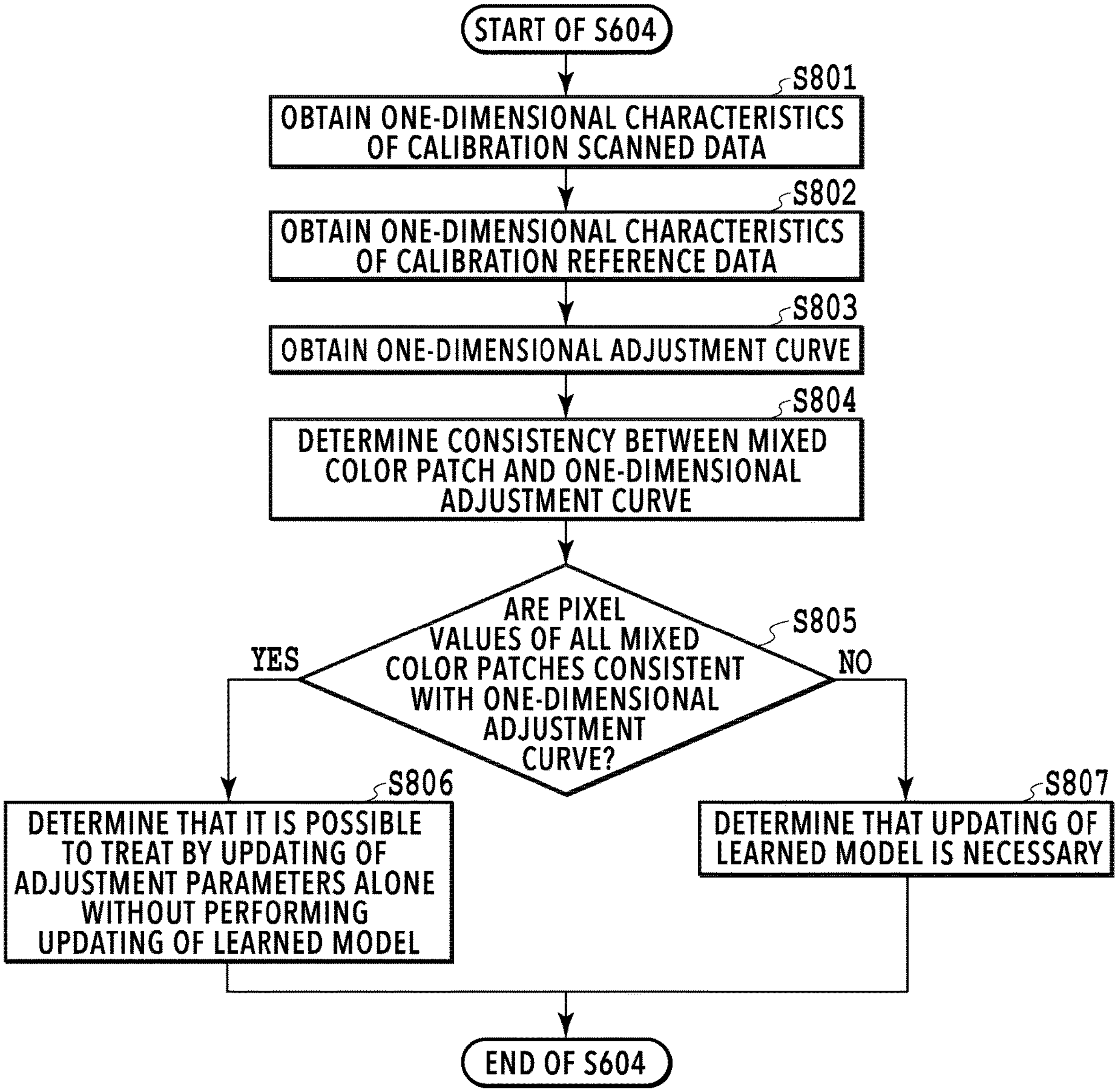
FIG. 8 is a flowchart showing one example of a flow of processing at S604 shown in FIG. 6.

With reference to FIG. 8, the processing flow of the determination processing of the determination unit 420 at S604 is explained. FIG. 8 is a flowchart showing one example of the processing flow of the determination processing in the determination unit 420 according to Embodiment 1 and is a flowchart showing one example of the flow of the processing at S604 shown in FIG. 6. First, at S801, the determination unit 420 obtains one-dimensional characteristics (in the following, called "one-dimensional characteristics of calibration scanned data) in each channel of RGB from the area corresponding to the one-dimensional characteristics patch in the calibration scanned data obtained at S602. The method of obtaining one-dimensional characteristics is explained in detail with reference to FIG. 7A. From a calibration scanned image (8-bit image of three channels of RGB) represented by the calibration scanned data, the pixel value in the area (in the following, called "patch area") corresponding to each patch is obtained and taken as one-dimensional characteristics. The one-dimensional characteristics are obtained, for example, as one vector whose components are each component value of RGB by the calculation of statistics, such as the mean, the median, the mode or the like of the values of a plurality of pixels included within each patch area. Here, the one-dimensional characteristics mean characteristics of the pixel value for brightness (lightness) different from one another in the same hue (channel).

Next, at S802, the determination unit 420 obtains one-dimensional characteristics of the calibration reference data obtained at S603 as at S801. Next, at S803, the determination unit 420 obtains a one-dimensional adjustment curve (one-dimensional gamma curve) for putting the calibration reference data close to the calibration scanned data. Specifically, the determination unit 420 obtains the one-dimensional adjustment curve by comparing the one-dimensional characteristics of the calibration scanned data obtained at S801 with the one-dimensional characteristics of the calibration reference data obtained at S802.

Figure 9:
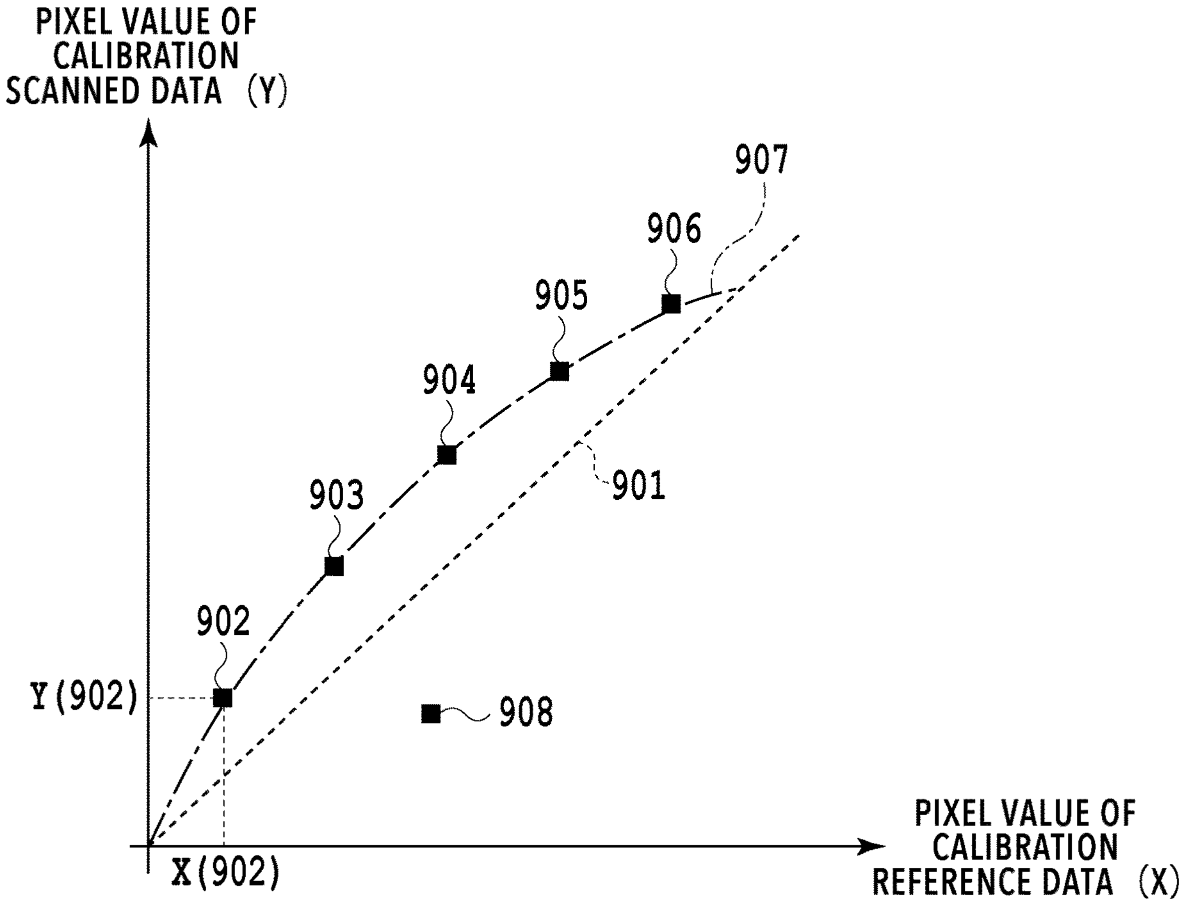
FIG. 9 is a diagram showing one example of one-dimensional characteristics of calibration scanned data and calibration reference data according to Embodiment 1.

With reference to FIG. 9, the method of obtaining the one-dimensional adjustment curve is explained. FIG. 9 is a diagram showing one example of the one-dimensional characteristics of the calibration scanned data and the calibration reference data according to Embodiment 1. In FIG. 9, the horizontal axis (X-axis) represents the pixel value of the calibration reference data and the vertical axis (Y-axis) represents the pixel value of the calibration scanned data. In the following, explanation is given on the assumption that the pixel value of the red (R) channel is shown in FIG. 9 as one example. In the processing at S801 and S802, the pixel values of the area (patch area) corresponding to each patch included in the one-dimensional characteristics patch of red (R) in the row 704 of each of the calibration reference data and the calibration scanned data are obtained. Each of points 902 to 906 shown in FIG. 9 indicates the plotted pixel value in each patch area, and the plotted pixel value obtained from each patch area corresponding to the row 704 shown in FIG. 7A.

A straight line 901 indicated by a broken line indicates a case where Y=X, that is, the pixel value of the calibration reference data and the pixel value of the calibration scanned data are equal to each other. The straight line 901 indicates the state where the learned model generates calibration reference data correctly simulating calibration scanned data, and indicates the characteristics in a case where color fluctuations have not occurred since the previous generation of calibration reference data. A curve 907 indicated by a one-dot chain line is an approximate curve obtained based on the points 902 to 906 and one example of the one-dimensional adjustment curve of the R channel, which is obtained based on the calibration reference data and the calibration scanned data obtained by the image processing apparatus 100.

For example, in a case where the X-coordinate of the point 902 is taken to be X (902) and the Y-coordinate of the point 902 is taken to be Y (902), it is possible to put both colors close to each other by converting the pixel value X (902) of the calibration reference data into the pixel value Y (902) of the calibration scanned data. The parameters used for this conversion are the adjustment parameters of the adjustment unit 404. The adjustment parameters may be those obtained by substituting numerical values in the curve 907, which is the one-dimensional adjustment curve approximated by an arbitrary mathematical formula, such as a polynomial expression, in the adjustment processing. Further, the adjustment parameters may be those obtained by interpolation, such as linear interpolation, between coordinates in the adjustment processing by the adjustment unit 404 storing the coordinates of the points 902 to 906 in advance. At S803, the determination unit 420 obtains the one-dimensional adjustment curve of each channel of RGB.

Next, at S804, the determination unit 420 refers to the calibration scanned data again and determines whether the pixel values of the area corresponding to each mixed color patch included in the mixed color characteristics obtaining area 703 in the calibration scanned data are consistent with the one-dimensional adjustment curve found at S803. Specifically, for example, the determination unit 420 plots each of the RGB pixel values of the area corresponding to each mixed color patch on the one-dimensional adjustment curve of corresponding RGB, which is shown in FIG. 9 as one example. For example, it is assumed that the point at which the R pixel value of a certain mixed color patch is plotted is a point 908. At this time, the point 908 is located in the area on the opposite side of the one-dimensional adjustment curve with Y=X being sandwiched in between. That is, the direction of the deviation of the one-dimensional adjustment curve and that of the position at which the R pixel value of the mixed color is plotted are opposite to each other and the position at which the R pixel value of the mixed color is plotted deviates considerably from the one-dimensional adjustment curve. In the case such as this, the determination unit 420 determines that the pixel value of the area corresponding to the mixed color patch is not consistent with the one-dimensional adjustment curve. On the contrary, in a case where the position at which the pixel value of the area corresponding to the mixed color patch is in the area on the same side in all the channels of RGB and in the vicinity of the one-dimensional adjustment curve, the determination unit 420 determines that the pixel value of the area corresponding to the mixed color patch is consistent with the one-dimensional adjustment curve.

The curve 907 shown in FIG. 9 as one example represents that in order to put the calibration reference data close to the calibration scanned data, correction should be performed toward the direction in which the pixel value becomes large for the R channel. On the other hand, the point 908 represents that correction should be performed toward the direction in which the pixel value of the R channel becomes small. The characteristics contradictory to each other as described above mean that it is not possible to correct the color fluctuations with the one-dimensional adjustment curve in the color area because of the complicated action of the mixed color. As a specific determination method, for example, the determination unit 420 determines whether or not the area including the one-dimensional adjustment curve and the area including the position at which the pixel value of the mixed color is plotted match each other in the two areas with the straight line Y=X being sandwiched in between. It may also be possible for the determination unit 420 to determine whether or not the distance from the position at which the pixel value of the mixed color is plotted to the one-dimensional adjustment curve is within a predetermined threshold value, and so on. The determination unit 420 performs the above-described determination in each channel of RGB for the pixel value of the area corresponding to each mixed color patch. In a case where even one channel not consistent with the one-dimensional adjustment curve exists, the determination unit 420 determines that the pixel value of the area corresponding to the mixed color patch is not consistent with the one-dimensional adjustment curve for each mixed color patch.

Next, at S805, the determination unit 420 determines whether or not the pixel values of the areas corresponding to all the mixed color patches are consistent with the one-dimensional adjustment curve. In a case where it is determined that the pixel values of the areas corresponding to all the mixed color patches are consistent with the one-dimensional adjustment curve at S804, the determination unit 420 determines that in order to calibrate color fluctuations, it is possible to treat by the updating of the adjustment parameters alone without performing the updating of the learned model at S806. In a case where it is determined that even one pixel value of the corresponding area among the plurality of mixed color patches is not consistent with the one-dimensional adjustment curve at S804, the determination unit 420 determines that in order to calibrate color fluctuations, the updating of the learned model is necessary. The determination unit 420 takes the determination results by the processing at S806 or S807 as the method of calibration processing obtained as the determination results at S604. After the processing at S806 or S807, the determination unit 420 terminates the processing of the flowchart shown in FIG. 8.

The effects of the processing at S604 are explained. The learned model has learned the characteristics of the image forming apparatus 104 sufficiently. Because of this, in a case where fluctuations (color fluctuations) have not occurred in the characteristics, the pixel value of the predicted image generated by the learned model and the pixel value of the scanned image are expected to be very close to each other, that is, to be on the straight line Y=X shown in FIG. 9. However, because of the color fluctuations of the image forming apparatus 104, there is a case where the color of a printed material, that is, the pixel value of the scanned image is different from the pixel value of the predicted image as described above. The color fluctuations as above result from the physical or environmental factor, and therefore, it is difficult to suppress the occurrence thereof. Further, the predicted image that is generated by the learned model is an image simulating the characteristics of the color appearance of the image forming apparatus 104 in learning, and therefore, it is not possible for the learned model to simulate the characteristics of the color appearance of the image forming apparatus 104 for the color fluctuations having occurred after the completion of learning.

Particularly, in a case where the color fluctuations occur not locally but in the whole printed material, the color fluctuations are unlikely to be visually conspicuous except for excessive fluctuations, and therefore, there are many cases where such a printed material is accepted as one satisfying a predetermined quality. However, even in a case where such color fluctuations at an acceptable level occur, in a comparison between the reference data with the scanned data, the difference between each pixel value is included in the calculation, and therefore, there is a case where a printed material in which color fluctuations at an acceptable level occur is detected excessively as a defect. Further, in a case where the threshold value of the inspection is changed so as to accept a printed material in which color fluctuations occur in order to suppress such excessive detection, there is a case where a defect that should originally be detected as a defect is overlooked.

As a method of suppressing the above-described excessive detection, a method is considered in which the learned model used by the prediction unit 403 is updated to a learned model in accordance with the current color fluctuations. Specifically, the scanned data corresponding to the printed material in the state where color fluctuations have occurred is taken as correct answer data and new or additional learning is performed and a learned model (in the following, called "updated learned model") obtained by the learning is used as the learned model used by the prediction unit 403. The predicted image generated by the updated learned model simulates the characteristics of the color appearance of the image forming apparatus 104 in which color fluctuations have occurred, and therefore, it is possible to generate a predicted image following the color fluctuations.

However, the updating of the learned model has a problem, such as a risk or disadvantage to a user. One of problems is, first, that it is not possible to sufficiently guarantee the results of the learning in a case where a learned model is generated anew. Generally, it is not easy to predict details of a learned model that is generated before learning and control the learning results completely. As regards the learned model stored in advance in the image processing apparatus 100, it is possible to provide a learned model whose quality is guaranteed through the sufficient verification by a manufacturer of the image processing apparatus 100 as described above. However, it is not necessarily possible to guarantee the same quality for the learned model generated arbitrarily under the use environment of an end user. That is, there is a possibility that the updating of the learned model will cause deterioration in quality in the form of the occurrence of artifact in the predicted image and the like. Another problem is that in order to perform new or additional learning, the time for learning, printing for obtaining scanned data as correct answer data of learning data, and the like become necessary. The wasteful use of time and resources such as this will be a cost to a user.

Consequently, in the present embodiment, the image processing apparatus 100 is provided with the adjustment unit 404 configured to perform one-dimensional gamma correction for each channel for the predicted image in order to generate reference data by adjusting the predicted image in accordance with color fluctuations. The image processing apparatus 100 generates data (reference data) of the reference image obtained by causing the predicted image to follow the color fluctuations by the adjustment of the adjustment unit 404. Due to this, it is possible for the image processing apparatus 100 to generate reference data treating the color fluctuations of the image processing apparatus 100 without taking a risk of deterioration in quality accompanying the updating of the learned model or without paying the cost accompanying the new or additional learning.

However, this does not mean that it is possible to treat all the color fluctuations by the adjustment of the adjustment unit 404 alone. Particularly, in the mixed color representing a color by mixing inks of a plurality of colors, the characteristics of its coloring are complicated. Because of this, even in a case where the characteristics are corrected independently for each channel, coloring of all the mixed colors is not necessarily consistent with the one-dimensional adjustment curve (curve 907) shown in FIG. 9 as one example. As described above, in a case where the color fluctuations of the mixed color that cannot be corrected by the adjustment of the adjustment unit 404 alone occur and it is necessary to generate reference data that also takes the color fluctuations into consideration, the updating of the above-described learned model becomes necessary.

Consequently, in the present embodiment, the image processing apparatus 100 is provided with the determination unit 420 configured to determine whether it is possible to sufficiently treat the color fluctuations by applying the one-dimensional adjustment curve or the updating of the learned model is necessary. According to the image processing apparatus 100 such as this, it is made possible to determine whether or not the updating of the learned model having a possibility of causing a risk or disadvantage to a user is necessary by correctly grasping the degree or characteristics of the color fluctuations of the mixed color by the determination of the determination unit 420.

After S604, at S605, the determination unit 420 determines whether or not it has been determined that the updating of the learned model is necessary at S604. In a case where it has been determined that the updating of the learned model is not necessary at S604, that is, it has been determined that only the adjustment parameters are updated, at S610, the adjustment updating unit 506 updates the adjustment parameters used in a case where the adjustment unit 404 makes adjustment. Specifically, in this case, the adjustment updating unit 506 updates the adjustment parameters by rewriting the adjustment parameters used by the adjustment unit 404 by using the one-dimensional adjustment curve obtained at S803. In a case where it has been determined that the updating of the learned model is necessary at S604, the learning chart output control unit 504 causes the image forming apparatus 104 to output a learning chart by controlling the image forming apparatus 104 at S606. After S606, at S607, the scanning unit 406 causes the scanning apparatus 105 to scan the learning chart output at S606 by controlling the scanning apparatus 105 and obtains learning scanned data.

In a case where the learning chart is taken to be the chart the same as the calibration chart, it is possible to use the calibration scanned data obtained at S602 as the learning scanned data. In this case, it is also possible to omit the processing at S606 and S607. However, the learning data is used for new or additional learning and an important element determining the quality of the learned model, and therefore, it is preferable for the learning data to be a chart including not only patches and with less imbalance than the calibration chart. On the contrary, in a case where the image forming apparatus 104 is always caused to output the chart suitable to the learning chart as the calibration chart, the number of wasted sheets increases. From this point also, it is preferable to make the calibration chart and the learning chart differ from each other as different charts.

An aspect of the learning chart is explained. In the generation of a new learned model including additional learning for the existing learned model, the learning data used for new or additional learning is important because it affects the quality of the learned model to be generated. In order to widely deal with each and every input image, it is generally desirable to include in the learning data in advance data of many colors and of many types of image, not limited to specific colors or types of image, such as the patch image. On the other hand, in the present embodiment, a case where a learned model is generated anew is a case where a specific color exists, which cannot be corrected by the adjustment processing of the adjustment unit 404 alone. Because of this, it is important for the color fluctuations of the specific color to be reproduced by generating a new learned model. Consequently, it may also be possible for the image processing apparatus 100 to control the output of the learning chart so that the amount of learning data including the specific color increases for the learning data used for the generation of a new learned model.

More specifically, for example, the image processing apparatus 100 performs processing as follows. The learning chart output control unit 504 stores in advance learning image data (in the following, called "basic learning image data") corresponding to the learning chart taken as a basis. Here, it is possible for the determination unit 420 to obtain information on the color that cannot be corrected by the adjustment processing of the adjustment unit 404 alone in the processing to determine consistency between the pixel value and the one-dimensional adjustment curve at S804. The learning chart output control unit 504 receives the information from the determination unit 420 and modifies the basic learning image data so that the number of colors that cannot be corrected by the adjustment processing alone and the number of colors similar to the color increase, and then, adds new learning image data or changes the basic learning image data. Further, the learning chart output control unit 504 causes the image forming apparatus 104 to output a learning chart by using the learning image data obtained by the addition or change.

By adding the scanned data of the learning chart (learning scanned data) such as this as learning data, it is possible to perform efficient learning in a case where a new learned model is generated. In a case where the learning data corresponding to the color that cannot be corrected by the adjustment processing alone is added or changed, it may also be possible to enable a user to give instructions or control to add or change the learning data of which color of a plurality of colors that cannot be corrected by the adjustment processing alone. Further, in this case, it may also be possible to enable a user to give instructions or control, to what extent, to increase the amount of learning data corresponding to the color that cannot be corrected by the adjustment processing alone.

After S607, at S608, the model updating unit 505 generates a new learned model by learning using the learning halftone image data and the learning scanned data obtained at S607 as learning data and performs updating to the new learned model as the learned model used by the prediction unit 403. After S608, at S609, the adjustment updating unit 506 updates the adjustment parameters used in a case where the adjustment unit 404 makes adjustment. Specifically, the adjustment updating unit 506 updates the one-dimensional adjustment curve used in a case where the adjustment unit 404 makes adjustment as the adjustment parameters.

The predicted image that the learned model updated by the processing at S608 generates is obtained by learning the color reproduction in the state where color fluctuations have occurred, and therefore, it is preferable to change the one-dimensional adjustment curve, which is the adjustment parameters, so as to be consistent with the updated learned model. Specifically, the adjustment updating unit 506 changes the one-dimensional adjustment curve to the straight line corresponding to the straight line (straight line 901 shown in FIG. 9) not changing the pixel value, that is, resets the one-dimensional adjustment curve. It may also be possible for the adjustment updating unit 506 to update the adjustment parameters as follows. Specifically, first, the adjustment updating unit 506 obtains the one-dimensional adjustment curve again by giving instructions to perform the same processing as that at S802 and S803 in the image forming apparatus 104 after updating the learned model. Following this, the adjustment updating unit 506 updates the adjustment parameters by calculating new adjustment parameters for adjusting the predicted image generated by the updated learned model. After S609 or S610, the image processing apparatus 100 terminates the processing of the flowchart shown in FIG. 6.

After the flowchart is completed, the reference data generated by the image processing apparatus 100 is data following the current color fluctuations. Because of this, according to the image processing apparatus 100, it is possible to suppress excessive detection of a defect as described above in the inspection of a printed material. Further, the image processing apparatus 100 is configured so that only the adjustment parameters are updated in a case where it is possible to treat color fluctuations by the updating of the adjustment parameters, and the learned model is updated only in a case where the updating of the learned model is necessary. According to the image processing apparatus 100 thus configured, it is possible to reduce the number of times of reproduction or updating of the learned model while treating color fluctuations. As a result, it is possible to reduce the risk of changing the existing learned model carelessly, the time required for new or additional learning, the use of the printing medium, ink, or toner used for outputting the learning chart, or the like.

Embodiment 2

Figure 10:
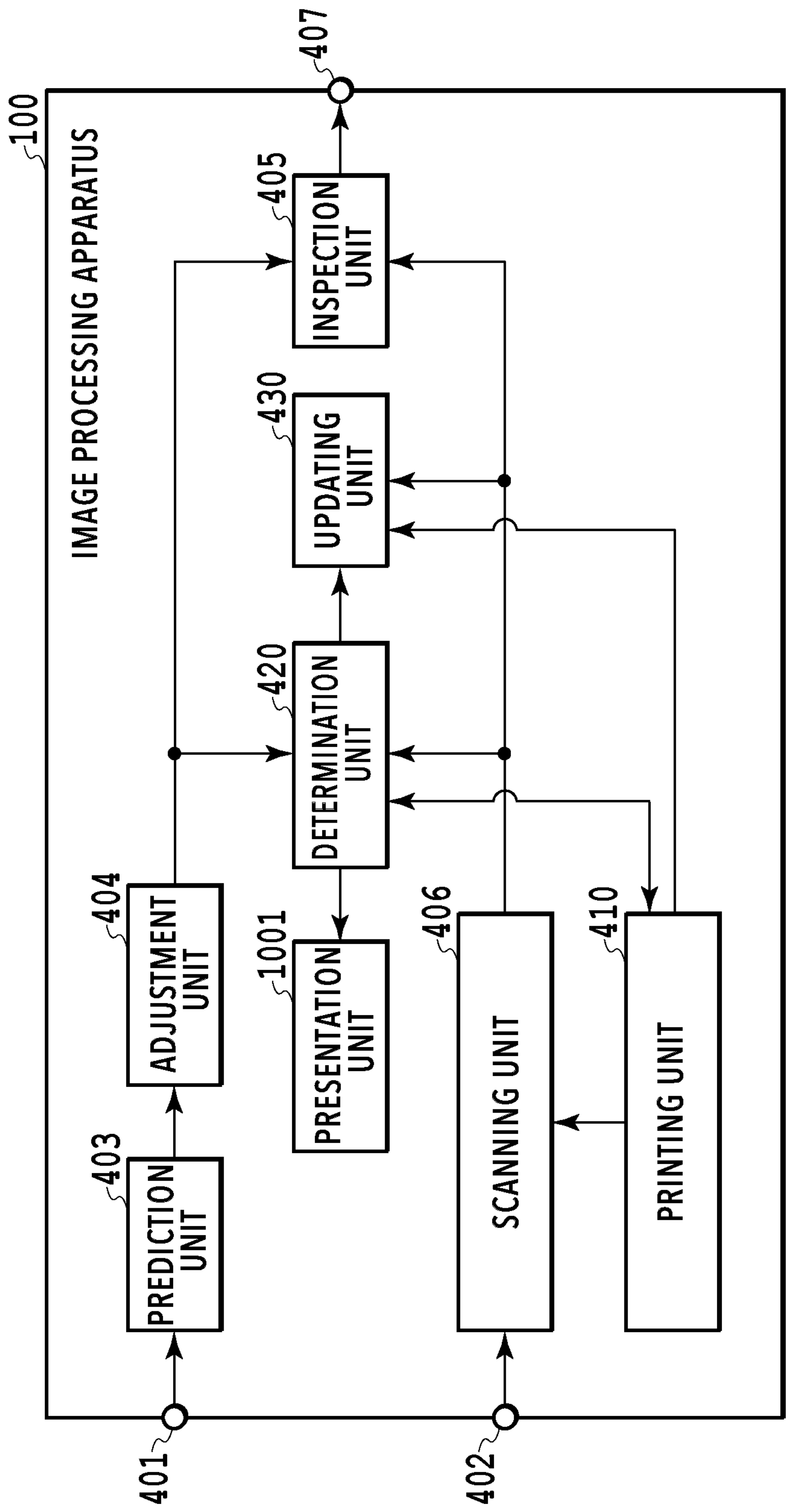
FIG. 10 is a block diagram showing one example of a function configuration of an image processing apparatus according to Embodiment 2.
Figure 11:
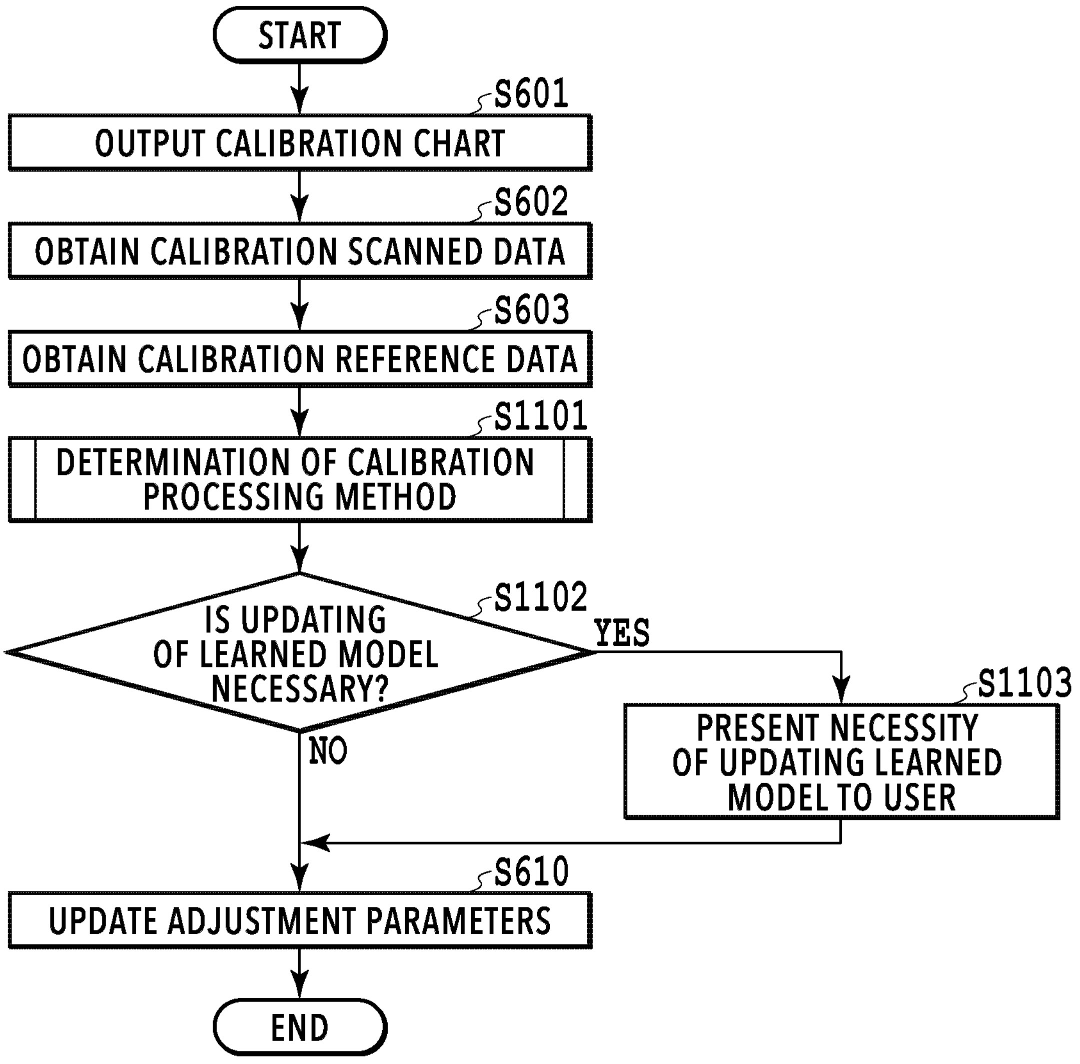
FIG. 11 is a flowchart showing one example of a processing flow of calibration processing in the image processing apparatus according to Embodiment 2.

With reference to FIG. 10 and FIG. 11, the image processing apparatus 100 according to Embodiment 2 is explained. The image processing apparatus 100 according to Embodiment 1 automatically determines the method of calibration processing based on the calibration reference data and the calibration scanned data. Here, the determination of the method of calibration processing is to determine whether it is necessary to perform the updating of the learned model or only the updating of the adjustment parameters is performed without the need to perform the updating of the learned model. In contrast to this, the image processing apparatus 100 according to Embodiment 2 (in the following, described simply as "image processing apparatus 100") causes a user to determine the timing or the method of calibration processing by presenting results of the determination of the method of calibration processing to the user. Particularly, the image processing apparatus 100 causes a user to determine the timing of the updating of the learned model or the method. In Embodiment 2, explanation of the contents common to those of Embodiment 1 is omitted and points different from those of Embodiment 1 are explained mainly.

FIG. 10 is a block diagram showing one example of the function configuration of the image processing apparatus 100 according to Embodiment 2. The image processing apparatus 100 has a presentation unit 1001, in addition to the function configuration of the image processing apparatus 100 according to Embodiment 1. The presentation unit 1001 performs output control for, by receiving information (in the following, called "calibration determination information") indicating results of determination of the method of calibration processing from the determination unit 420, presenting the calibration determination information to a user. Further, it is possible for the presentation unit 1001 to receive the data of the predicted image obtained by the determination unit 420 from the prediction unit 403 from the determination unit 420 and utilize the data for presenting the calibration determination information.

FIG. 11 is a flowchart showing one example of a processing flow of calibration processing in the image processing apparatus 100 according to Embodiment 2. In explanation of the processing flow, to the same processing as that in FIG. 6, the same symbol is attached and explanation thereof is omitted. First, the image processing apparatus 100 performs the processing at S601 to S603. After S603, at S1101, the determination unit 420 determines the method of calibration processing based on the calibration scanned data and the calibration reference data. The processing at S1101 is similar to the processing at S604, but while the processing at S604 determines the method of calibration processing that is performed from now on, the processing at S1101 only determines the method of calibration processing necessary for sufficiently treating the color fluctuations having occurred.

Next, at S1102, the determination unit 420 determines whether or not it has been determined that the updating of the learned model is necessary at S1101. Specifically, the determination unit 420 determines whether or not it has been determined that the updating of the learned model is necessary for sufficiently treating the color fluctuations having occurred. In a case where it has been determined that the updating of the learned model is not necessary for treating the color fluctuations having occurred at present, that is, it has been determined that only the updating of the adjustment parameters used by the adjustment unit 404 for adjustment is sufficient at S1101, the image processing apparatus 100 performs the processing at S610. In a case where it has been determined that only the updating of the adjustment parameters is not sufficient to treat all the color fluctuations having occurred at present and the updating of the learned model is necessary at S1101, the image processing apparatus 100 performs the processing at S1103. Specifically, in this case, at S1103, the presentation unit 1001 performs control for presenting a message to a user, which indicates that the updating of the learned model is necessary in order to sufficiently treat the color fluctuations having occurred at present.

For example, the presentation unit 1001 performs control to generate a display image to this effect and output a signal indicating the generated display image to the output device 109. Due to this, on the output device 109, the display image is displayed and it is possible to present this effect to a user visually. For example, the presentation unit 1001 generates a display image with which a message such as "A change in density has occurred in the printing results. In order to carry out inspection taking the change in density into consideration with a high accuracy, regenerate the learned model. It is also possible to continue inspection with simple adjustment without performing regeneration." is displayed on the output device 109. The method of presentation to a user is not limited to the presentation by a display, and presentation by voice or the like may be acceptable. After S1103, the image processing apparatus 100 performs the processing at S610. After S610, the image processing apparatus 100 terminates the processing of the flowchart shown in FIG. 11.

For example, it is possible for a user to arbitrarily determine timing at which the learned model is updated based on the message presented at S1103 and instruct the image processing apparatus 100 to update the learned model. The image processing apparatus 100 performs the processing at S606 to S609 based on the instructions to update the learned model from a user and regenerates reference data after performing the updating of the learned model.

According to the image processing apparatus 100 configured as above, it is possible for a user to perform the updating of the learned model at desired timing after totally taking into consideration the operating situation of the image forming apparatus 104, the risk accompanying the updating of the learned model, the cost for the updating, or the like. As a result, it is possible to perform calibration necessary for the appropriate inspection of a printed material in the form closer to the intention of a user. [Modification Example 1 of Embodiment 2]

Figure 12:
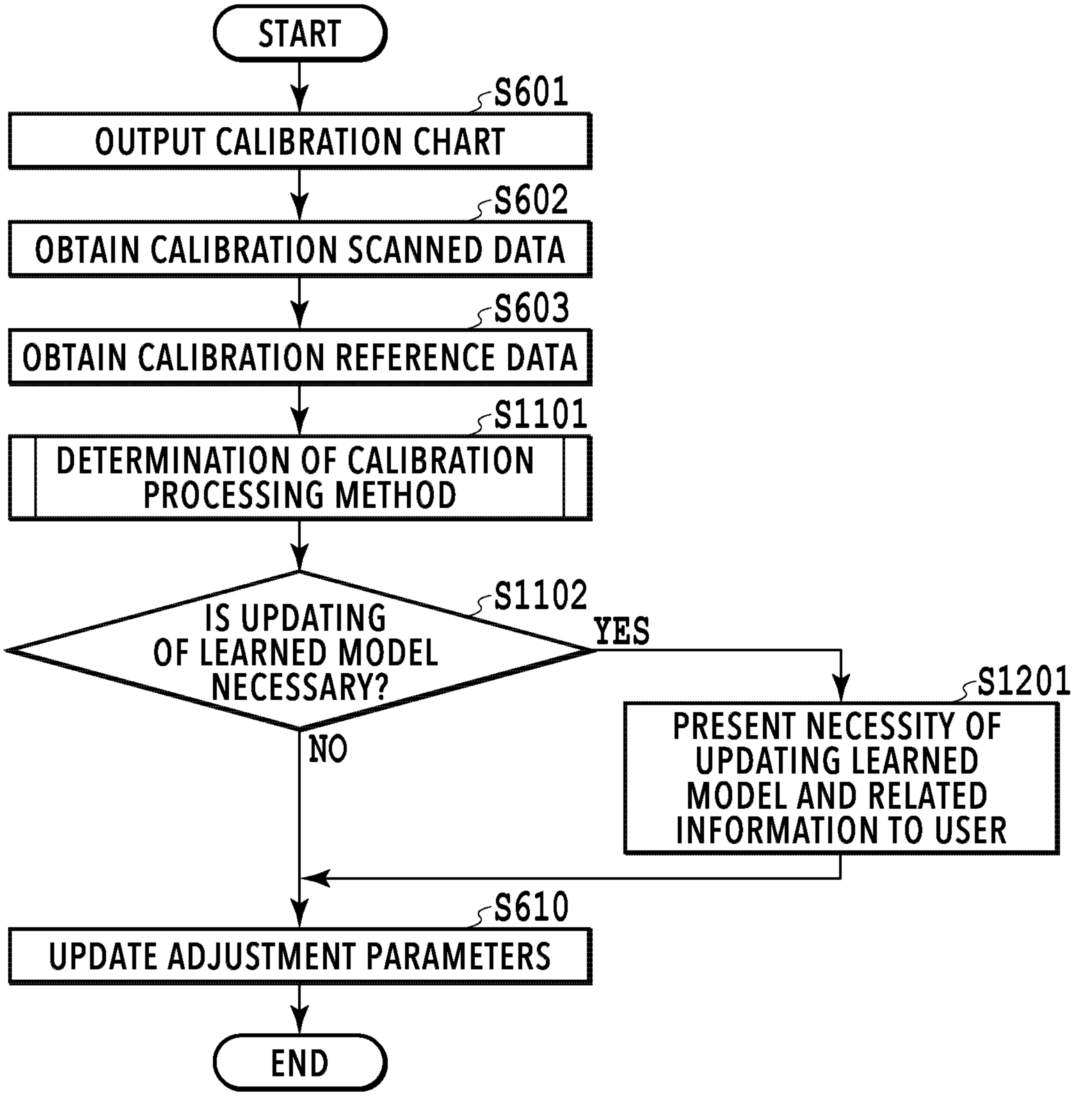
FIG. 12 is a flowchart showing one example of a processing flow of calibration processing in an image processing apparatus according to Modification Example 1 of Embodiment 2.
Figure 13:
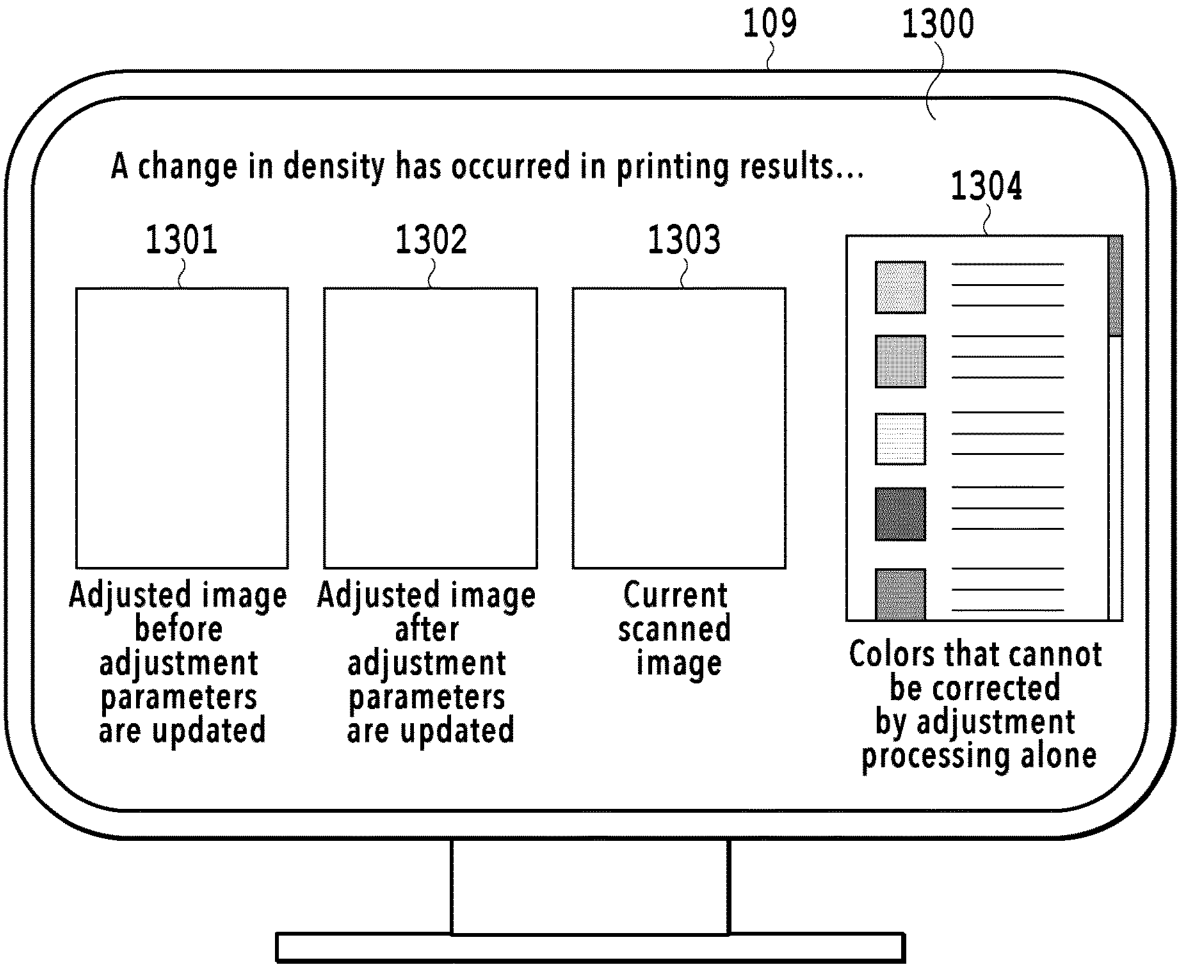
FIG. 13 is a diagram showing one example of a display screen according to Modification Example 1 of Embodiment 2.

With reference to FIG. 12 and FIG. 13, an image processing apparatus according to Modification Example 1 of Embodiment 2 (in the following, simply described as "Modification Example 1") is explained. The function configuration of the image processing apparatus according to Modification Example 1 is the same as the function configuration of the image processing apparatus according to Embodiment 2 shown in FIG. 10 as one example. Consequently, in the following, the image processing apparatus according to Modification Example 1 is described as "image processing apparatus 100" and explanation is given by attaching the symbol shown in FIG. 10 to each function configuration of the image processing apparatus 100. The image processing apparatus 100 according to Embodiment 2 performs control, in a case where it is determined that the updating of the learned model is necessary, to present the contents of the determination results to a user. In contrast to this, the image processing apparatus 100 according to Modification Example 1 performs control for presenting to a user, also, in addition to the necessity of updating the learned model, related information relating to color fluctuations, which is obtained based on scanned data.

FIG. 12 is a flowchart showing one example of a processing flow of calibration processing in the image processing apparatus 100 according to Modification Example 1. In explanation of the processing flow, to the same processing as that in FIG. 11, the same symbol is attached and explanation thereof is omitted. Compared to the flowchart shown in FIG. 11, in the flowchart shown in FIG. 12, the processing at S1103 is replaced with processing at S1201. That is, at S1102, the determination unit 420 determines whether or not it has been determined that the updating of the learned model is necessary at S1101 and in a case where it has been determined that the updating of the learned model is necessary at S1101, the image processing apparatus 100 performs the processing at S1201. At S1201, the presentation unit 1001 performs control for presenting the necessity of updating the learned model and the related information relating to color fluctuations to a user.

FIG. 13 is a diagram showing one example of a display screen 1300 on which the presentation unit 1001 according to Modification Example 1 presents related information relating to color fluctuations to a user via the output device 109. On the display screen 1300, in an area 1301, an image (in the following, called "adjusted image") is displayed, which is an image after the adjustment unit 404 adjusts the predicted image generated by the prediction unit 403 based on the data of the input image by using the adjustment parameters before updating. In an area 1302, an adjusted image is displayed, which is an image after the adjustment unit 404 adjusts the predicted image by using the updated adjustment parameters. In an area 1303, a scanned image is displayed, which is obtained by the scanning apparatus 105 scanning the printed material in which the image forming apparatus 104 forms the input image on a printing medium. In a case where the data of the scanned image is not obtained, the display of the scanned image in the area 1303 is omitted. For the display of the scanned image, it may also be possible for the image processing apparatus 100 to cause the image forming apparatus 104 to print a small number of copies of the input image, such as one copy, in the processing at S601 and S602, and cause the scanning apparatus 105 to scan the printed material.

In an area 1304, as related information relating to color fluctuations, information relating to a color (in the following, called "untreatable color") that cannot be treated by the updating of the adjustment parameters alone is displayed. Specifically, for example, in the column on the left side within the area 1304, the untreatable color is displayed as a preview in the shape of a patch. Further, for example, in the column on the right side within the area 1304, the pixel value or the like of the untreatable color is displayed. Information that is displayed in the column on the right side within the area 1304 is not limited to the pixel value. For example, in the column on the right side within the area 1304, information or the like indicating the ratio in which the untreatable color, or the untreatable color and the color similar to the untreatable color occupy the above-described input image may be displayed. At the right end of the area 1304, for example, a scroll bar is displayed and it is possible for a user to check related information relating to a desired untreatable color by changing the position of the scroll bar. Information relating to the untreatable color is obtained by the mixed color whose pixel value is not consistent with the one-dimensional adjustment curve being identified in the processing to investigate the consistency between the pixel value of the mixed color and the one-dimensional adjustment curve at S804.

The display order of the untreatable colors is arbitrary, but for example, it may also be possible to display the untreatable colors in order from the untreatable color whose number of inconsistent channels is the largest, or in order from the untreatable color whose difference between the pixel value of the image after the adjustment processing using the adjustment parameters for the calibration predicted image and the pixel value of the calibration scanned image is the largest. Further, it may also be possible to highlight the image area corresponding to the untreatable color in the image that is displayed in the area 1302. In a case where the learned model is updated, it may also be possible to add the display of a predicted image generated by the updated learned model to the display screen 1300, or display the predicted image in the area 1302. Further, it may also be possible to update information that is displayed in the area 1304.

According to the image processing apparatus 100 configured as above, it is possible for a user to check how the adjusted image has changed by the updating of the adjustment parameters by comparing the adjusted image before the adjustment parameters are updated with the adjusted image after the adjustment parameters are updated. Further, it is possible for a user to check to what extent the updated adjusted image follows the current color fluctuations by comparing the adjusted image after the adjustment parameters are updated with the scanned image. Furthermore, it is possible for a user to check the position of the untreatable color in the adjusted image by comparing the adjusted image before the adjustment parameters are updated with information relating to the untreatable color. Due to this, for example, it is possible to check whether or not the untreatable color is an important color in the printed material, or what degree of importance the updating of the learned model has. Due to this, it is made possible for a user to perform more appropriate determination as to whether or not to update the learned model by taking into consideration the advantage and disadvantage of the updating of the learned model.

Other Embodiments

In the above-described embodiment, one example of the calibration chart is explained, but the calibration chart is not limited to that described above. For example, in the above-described embodiment, as the one-dimensional characteristics patch, the patch of each channel (hue) of RGB is used. The reason is that the color space in the adjustment processing of the adjustment unit 404 is the space by three channels of RGB, and therefore, as the one-dimensional characteristics patch of the calibration chart, the patch whose sensitivity is good in each channel is selected.

Because of this, the hue of the one-dimensional characteristics patch of the calibration chart may be a hue different from RGB. For example, by taking a plurality of patches whose lightness is different from one another in the mixed color gray as the one-dimensional characteristics patches, it may also be possible to obtain the R pixel value, the G pixel value, and the B pixel value in the area (patch area) corresponding to each patch in the calibration scanned image as the one-dimensional characteristics of the calibration scanned image. According to the calibration chart such as this, it is possible to reduce the number of rows of the one-dimensional characteristics patch from the three rows of RGB to one row of gray. Further, the color fluctuations occur resulting from the physical or environmental factor of the image forming apparatus 104. Because of this, the calibration chart may be one in which a plurality of patches whose lightness is different from one another in the colors corresponding to the colors (for example, CMYK) of ink that is used in a case where the image forming apparatus 104 forms an image is taken as the one-dimensional characteristics patch.

In a case where the color of the one-dimensional characteristics patch is changed in the calibration chart, the color of the mixed color patch may change because the mixed color patch in the calibration chart is a patch whose hue and ink ratio are different from those of the one-dimensional characteristics patch. Whether the patch of a certain color (for example, R) exists as the one-dimensional characteristics patch or the mixed color patch is not constant in the pattern that the calibration chart can take.

Further, the arrangement of patches is also not limited to that described above. In the above description, the patch may be elongated like a belt. In addition, the calibration chart is not limited to that in which areas are divided clearly like the one-dimensional characteristics obtaining area 702 and the mixed color characteristics obtaining area 703 in the calibration chart 701 and may be one in which areas are arranged randomly. By not dividing areas clearly into the one-dimensional characteristics obtaining area 702 and the mixed color characteristics obtaining area 703, in a case where there exists imbalance of characteristics depending on the position in image formation and image scanning, it is possible to lessen the influence of the imbalance. In a case where which positions the one-dimensional characteristics patch and the mixed color patch are arranged on the calibration chart, are known in advance, it is possible for the image processing apparatus 100 to perform the same processing as that of the above-described embodiment.

The image processing apparatus 100 according to Embodiment 1 determines the method of calibration processing based on the calibration scanned data and automatically updates the adjustment parameters and the learned model based on the results of the determination. Further, the image processing apparatus 100 according to Embodiment 2 and Modification Example 1 enables, in a case where the method of calibration processing determined based on the calibration scanned data is the updating of the learned model, a user to determine the timing of the updating of the learned model or the like by presenting the determination results to the user. However, the image processing apparatus may be one implementing both of those aspects at the same time.

Specifically, for example, a user inputs in advance conditions in a case where the learned model is updated to the image processing apparatus. These conditions are, for example, a case where color fluctuations that cannot be adjusted by the adjustment processing alone for the color designated by a user occur, a case where the magnitude of the deviation between the pixel values exceeds a permitted threshold value, a case where the deviation between the pixel values occurs continuously exceeding a designated time, or the like. The image processing apparatus retains information indicating the input conditions and basically operates like the image processing apparatus 100 according to Embodiment 2 and Modification Example 1. The image processing apparatus 100 according to Embodiment 2 and Modification Example 1 presents that the updating of the learned model is necessary to a user in the processing at S1103 or S1201 and generates a new learned model upon receipt of instructions of the user. In contrast to this, the image processing apparatus retaining information indicating the above-described conditions generates a new learned model in a case where the conditions are met as in the case where instructions of a user are given. According to the image processing apparatus configured as described above, it is possible to update the learned model without delay by reflecting the intention of a user without the need for a user to give instructions on the spot.

The image processing apparatus 100 according to Embodiment 1 automatically performs the updating of the learned model and the adjustment parameters. Further, the image processing apparatus 100 according to Embodiment 2 and Modification Example 1 automatically performs the updating of the adjustment parameters. However, it may also be possible to wait for the input of instructions of a user and perform updating based on the instructions in a case where the updating of the learned model or the adjustment parameters is performed. Particularly, in a case where the calibration processing is started based on instructions of a user, it is considered that the user directly operates the image processing apparatus 100, and therefore, it is considered that the user is in the state where it is easy for the user to determine whether or not to perform the updating of the learned model or the adjustment parameters. By performing the updating of the learned model or the adjustment parameters based on instructions of the user, it is possible to prevent the behavior of the image processing apparatus 100 from becoming different from what is intended by the user.

Further, in a case where the one-dimensional characteristics obtained by the processing at S801 or S804 are beyond the range of a printed material expected as a non-defective product and have a deviation whose magnitude is larger than a predetermined magnitude, it may also be possible to deal with this case as follows. In this case, for example, in place of performing the calibration processing for following color fluctuations, the image processing apparatus 100 gives presentation prompting a user to perform the output calibration of the image forming apparatus 104. Further, for example, the image processing apparatus 100 automatically performs the output calibration of the image forming apparatus 104. The determination of whether or not the one-dimensional characteristics obtained by the processing at S801 or S804 are beyond the range of a printed material expected to be a non-defective product is performed by, for example, comparing the one-dimensional characteristics with a predetermined threshold value. Due to this, in a case where the deviation in the state of the image forming apparatus 104 occurs, which is not included within the permitted color fluctuations, by causing the image forming apparatus 104 to output an appropriate printed material, it is possible to make an appropriate inspection of the printed material without aggressively following the reference data.

The adjustment unit 404 according to the above-described embodiment performs the one-dimensional gamma correction for each channel of the three channels of RGB. However, the adjustment processing in the adjustment unit 404 is not limited to the one-dimensional gamma correction. For example, as one example, the adjustment processing may be adjustment processing as follows. For example, it is assumed that the last layer (Nth layer) of the learned model used by the prediction unit 403 has a structure expressed by formula 3 below.

$$X_N = \tanh(X'_{N-1} + b_N) \quad \text{(formula 3)}$$

Here, $X_N$ is the output from this learned model and the array of three channels of RGB corresponding to data of a predicted image. $X'_{N-1}$ represents the results of performing the convolutional operation in this layer (Nth layer) for $X_{N-1}$, which is the feature map received from the previous layer ((N−1)th layer). That is, $X'_{N-1}=\Sigma W_{N-1}*X_{N-1}$ and at this point in time, the feature map is converted into the format for three channels of RGB. Here, $b_N$ is a bias of this layer (Nth layer) and has information that can be represented by a three-dimensional vector whose components are each component value of RGB. That is, formula 3 means that to each element in the array of $X'_{N-1}$, the corresponding component in this vector is added. Further, tanh ( ) is a hyperbolic tangent function and functions as the activation function in this layer (Nth layer). Here, the output of tanh ( ) is in the range between −1 and +1, and therefore, it is necessary to linearly convert each element of $X_N$, which is the output from this learned model, into the value from 0 to 255, which corresponds to the pixel value of an 8-bit image, but formula 3 is described by omitting this linear conversion.

In formula 3, the bias $b_N$ represented by using a three-dimensional vector having one scalar value as a component for each channel of RGB has a function to increase or decrease the output value in the whole area in each channel of RGB. That is, it is possible for the bias $b_N$ to adjust the pixel value of each channel of RGB. Compared to the one-dimensional gamma correction, the bias b translates the curve specified by tanh, and therefore, though it is not possible to perform arbitrary change for each pixel value band, it is possible to perform control with a small number of variables, such as one scalar value for each channel.

That is, in this system, scalability as follows exists. Specifically, scalability of the variable and control exists, such as (1) bias translating specified curve with one variable, (2) gamma correction describing an arbitrary adjustment curve of each channel with one dimension, and (3) learned model reproducing complicated color development with filters in multi layers and nonlinear operation. Among these, in the above-described embodiment, the gamma correction and the learned model are used separately, but it may also be possible to perform adjustment processing using the bias in place of the gamma correction. That is, it may also be possible for the adjustment unit 404 to perform adjustment processing using this bias in place of the one-dimensional gamma correction. Specifically, it is sufficient to select the bias value most appropriate to the obtained one-dimensional characteristics. Further, based on instructions of a user, such as instructions to "increase the degree of redness (or decrease the degree of redness)", it may also be possible to increase or decrease the bias value of the corresponding channel.

As is obvious from the above-described example, the adjustment unit 404 is not necessarily required to be completely separated from the prediction unit 403, and an aspect in which the adjustment unit 404 is included as part of the learned model, that is, an aspect in which the adjustment unit 404 is included in the prediction unit 403 may be acceptable. Further, it may also be possible for the adjustment unit 404 to perform the adjustment processing by using a learned model based on learning, which is different from the learned model used by the prediction unit 403. The learned model has a shortcoming of unlikely to predict the results after updating, and therefore, the adjustment unit 404 configured to perform the adjustment processing by using the adjustment parameters is provided, as described above.

However, by limiting the learned model used by the adjustment unit 404 to what follows color fluctuations in place of attempting to simulate the characteristics of the whole image, it is possible to be small-scale and simple and to limit the range of the influence caused by updates. Due to this, it is possible to reduce the time necessary for updating of the learned model used by the adjustment unit 404, the cost, such as resources, and the risk of updating the learned model. Even with the image processing apparatus having the adjustment unit 404 such as this, it is possible to generate reference data taking color fluctuations into consideration while suppressing the risk of carelessly updating the learned model used by the prediction unit 403, the time necessary for learning of the learned model, and the output of the learning chart.

The image processing apparatus 100 according to the embodiment described above updates the adjustment parameters used by the adjustment unit 404 and the learned model used by the prediction unit 403 so as to follow the color fluctuations occurring in the image forming apparatus 104. However, the updating of the adjustment parameters and the learned model is not limited to updating to follow color fluctuations and the image processing apparatus 100 may update the adjustment parameters and the learned model by taking state fluctuations occurring in the image forming apparatus 104 as a target.

In the embodiment described above, the explanation is given on the assumption that the color space in which adjustment processing is performed is the space of three channels of RGB, but the color space in which adjustment processing is performed is not limited to this. For example, the color space in which adjustment processing is performed may be the space of CMYK corresponding to the color of each ink, a perceptual color space, such as Lab, or the like.

The image processing apparatus 100 according to the embodiment described above generates the reference data by the adjustment unit 404 performing the adjustment processing for the predicted image generated by the learned model. However, it may also be possible to perform adjustment processing corresponding to processing opposite to the adjustment processing for the predicted image for the scanned data in a case where the reference data and the scanned data are compared in the inspection processing. Even with the configuration such as this, it is possible to make the same inspection as that in the case of the image processing apparatus 100 according to the embodiment described above. Specifically, it may also be possible to arrange the adjustment unit 404 in the post stage of the scanning unit 406 in place of arranging the adjustment unit 404 in the post stage of the prediction unit 403 in FIG. 4.

However, while it is sufficient to perform the adjustment processing only at the time of the generation of the reference data in a case where the adjustment processing is performed for the predicted image, in a case where adjustment processing is performed for the scanned data, it is necessary to perform the adjustment processing for each piece of the scanned data, that is, for each printed material. Because of this, it is preferable for the adjustment unit 404 to be arranged in the post stage of the prediction unit 403 and perform the adjustment processing for the predicted image. Further, from the point of view that the purpose of the embodiment for inspecting in what state a printed material actually is in a case where the color of the scanned data is modified becomes ambiguous, it can be said that it is better to perform the adjustment processing for the predicted image. Similarly, it may also be possible for the adjustment unit 404 to perform the adjustment processing for the data of the input image that is input to the image forming apparatus 104.

In the embodiment described above, as the application example of the image processing apparatus 100, explanation is given by assuming that the image processing apparatus 100 inspects a printed material. However, the application of the image processing apparatus 100 is not limited to this. For example, the image processing apparatus 100 may generate data of a preview image used for a preview display for checking the prediction of the printing results, in place of the reference data. Further, the image processing apparatus 100 may generate control parameters, setting values, or some information for determining them, which are used by the image forming apparatus 104, in place of the data of an image.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc.

According to the present disclosure, it is possible to reduce the number of times of generation of a new learned model or updating of an existing learned model while treating color fluctuations.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-22438, filed Feb. 16, 2023, which is hereby incorporated by reference herein in its entirety.

What is claimed is:

1. An image processing apparatus comprising:

one or more hardware processors; and one or more memories storing one or more programs configured to be executed by the one or more hardware processors, the one or more programs including instructions for:

(1) generating a predicted image, which is an image predicting an output image corresponding to an input image, by using a learned model; and (2) determining, based on the output image and the predicted image, between (a) updating the learned model and (b) updating adjustment parameters for adjusting a pixel value of a target image without updating the learned model, wherein the output image is a scanned image obtained by scanning a printing medium on which an image corresponding to the input image is formed, and wherein the learned model is updated by using data of a scanned chart obtained by scanning a learning chart.

2. The image processing apparatus according to claim 1, wherein the target image is the predicted image.

3. The image processing apparatus according to claim 1, wherein the one or more programs further include an instruction for updating at least one of the learned model and the adjustment parameters based on a result of the determining.

4. The image processing apparatus according to claim 1, wherein the one or more programs further include an instruction for performing output control for presenting, to a user, a result of the determining.

5. The image processing apparatus according to claim 4, wherein the one or more programs further include instructions for:

receiving instructions to update at least one of the learned model and the adjustment parameters from a user; and updating at least one of the learned model and the adjustment parameters based on the instructions.

6. The image processing apparatus according to claim 5, wherein in a case where the result is a determination to update the adjustment parameters without updating the learned model, the adjustment parameters are updated, and wherein in a case where the result is a determination to update the learned model, (1) output control for presenting the result to a user is performed and (2) the learned model is updated based on the instructions.

7. The image processing apparatus according to claim 6, wherein the one or more programs include instructions for presenting to a user, in addition to the result, information on a color.

8. The image processing apparatus according to claim 1, wherein the learned model is updated by using data of the scanned chart obtained by scanning the learning chart whose ratio of a color is increased.

9. The image processing apparatus according to claim 1, wherein after the learned model is updated, the adjustment parameters are also updated.

10. The image processing apparatus according to claim 1, wherein the one or more programs further include an instruction for inspecting whether or not the output image satisfies a predetermined reference by comparing an adjusted image, obtained by using the adjustment parameters on the target image, with the output image or the predicted image.

11. The image processing apparatus according to claim 1, wherein the one or more programs further include an instruction for performing output control for presenting an adjusted image, obtained by using the adjustment parameters on the target image, as a preview image of an image to be formed on a printing medium to a user.

12. An image processing method comprising the steps of:

generating a predicted image, which is an image predicting an output image corresponding to an input image, by using a learned model; and determining, based on the output image and the predicted image, between (a) updating the learned model and (b) updating adjustment parameters for adjusting a pixel value of a target image without updating the learned model, wherein the output image is a scanned image obtained by scanning a printing medium on which an image corresponding to the input image is formed, and wherein the learned model is updated by using data of a scanned chart obtained by scanning a learning chart.

13. A non-transitory computer-readable storage medium storing a program for causing a computer to perform a control method of an image processing apparatus, the control method comprising the steps of:

determining, based on the output image and the predicted image, between (a) updating the learned model and (b) updating adjustment parameters for adjusting a pixel value of a target image without updating the learned model, wherein the output image is a scanned image obtained by scanning a printing medium on which an image corresponding to the input image is formed, and wherein the learned model is updated by using data of a scanned chart obtained by scanning a learning chart.

* * * * *